(12) United States Patent
Srivathsan

(10) Patent No.: US 12,472,829 B2
(45) Date of Patent: Nov. 18, 2025

(54) SYSTEM FOR COHESIVELY HARNESSING MULTIPLE FORMS OF RENEWABLE ENERGY IN ELECTRIC VEHICLES AND STATIONARY APPLICATIONS

(71) Applicant: Kaustubhan Bangalore Srivathsan, Pune (IN)

(72) Inventor: Kaustubhan Bangalore Srivathsan, Pune (IN)

( * ) Notice: Subject to any disclaimer, the term of this patent is extended or adjusted under 35 U.S.C. 154(b) by 0 days.

(21) Appl. No.: 18/028,187

(22) PCT Filed: Jul. 22, 2021

(86) PCT No.: PCT/IB2021/056616
§ 371 (c)(1),
(2) Date: Mar. 23, 2023

(87) PCT Pub. No.: WO2023/002234
PCT Pub. Date: Jan. 26, 2023

(65) Prior Publication Data
US 2023/0406113 A1 Dec. 21, 2023

(30) Foreign Application Priority Data
Jul. 21, 2021 (IN) .............................. 202121032874

(51) Int. Cl.
*B60L 8/00* (2006.01)
(52) U.S. Cl.
CPC .............. *B60L 8/003* (2013.01); *B60L 8/006* (2013.01); *B60L 2210/10* (2013.01); *B60L 2210/30* (2013.01); *B60Y 2400/20* (2013.01)

(58) Field of Classification Search
CPC .. B60L 8/006; B60L 2210/10; B60L 2210/30; B60Y 2400/20
See application file for complete search history.

(56) References Cited

U.S. PATENT DOCUMENTS

| 2007/0272290 A1 | 11/2007 | Sims |
| 2019/0061533 A1 | 2/2019 | Wang et al. |
| 2020/0148029 A1 | 5/2020 | Zhou et al. |

FOREIGN PATENT DOCUMENTS

| CN | 108045235 A | * | 5/2018 | ................ B60L 7/26 |
| JP | WO2009101680 A | * | 8/2009 | ................ B60L 8/00 |
| KR | 20120031563 A | * | 4/2012 | ............. B60K 16/00 |
| WO | 2009101680 A1 | | 8/2009 | |

OTHER PUBLICATIONS

International Search Report for corresponding PCT Application No. PCT/IB2021/056616 mailed Oct. 26, 2021.

* cited by examiner

*Primary Examiner* — Bryan A Evans
(74) *Attorney, Agent, or Firm* — Wood, Phillips, Katz, Clark & Mortimer

(57) ABSTRACT

This invention provides for a multi-disciplinary energy harnessing mechanism for outfitting a vehicle. Accordingly, sub-systems for harnessing energy from various sources of renewable energy occurring in vicinity of/incidental to the vehicle, such as 5 solar, waste heat, running water, flowing wind, mechanical impacts, heat from the road surface being traversed are integrated into a vehicle whereby the effective range of the vehicle is increased while reducing the frequency and amount of charging otherwise required from the electric grid.

12 Claims, 18 Drawing Sheets

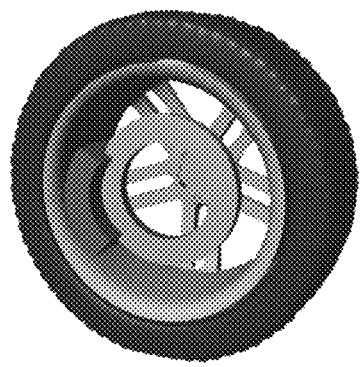
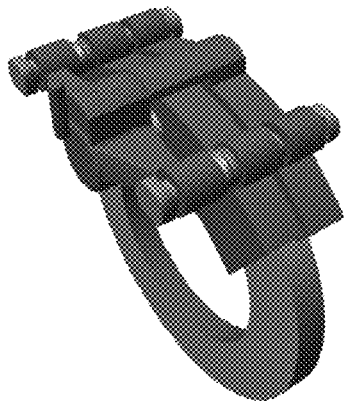
FIGURE 11A    FIGURE 11B
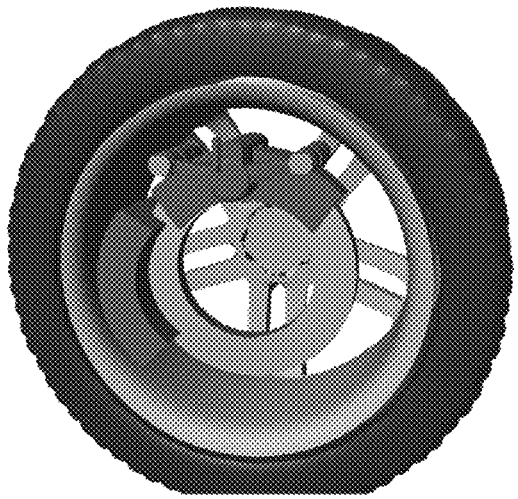
FIGURE 11C

SYSTEM FOR COHESIVELY HARNESSING MULTIPLE FORMS OF RENEWABLE ENERGY IN ELECTRIC VEHICLES AND STATIONARY APPLICATIONS

FIELD OF THE INVENTION

This invention belongs to the field of alternative fuels for automotive applications. More particularly, the present invention concerns with the construction, implementation and operations of a multidisciplinary system, which when integrated or otherwise outfitted in conjunction with an automobile or a stationary application, is capable of efficiently harnessing diverse sources of renewable energy for imparting or ceasing motion of said automotive vehicle and achieving increased power generation per unit floor area in case of stationary applications.

Definitions and Interpretations

Before undertaking the detailed description of the invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect, with, contain, be contained within, connect to or with, couple to or with, be communicable with, cooperate with, interleave, juxtapose, be proximate to, be bound to or with, have, have a property of, or the like; and the term "EV" refers to an electric vehicle, preferably a car; "road thermal energy" refers energy which emanates from road surface beneath a vehicle. In this document, references to coordinate axes inform of X,Y,Z axes refer the origin "O" located at the centre of Front left wheel and X,Y,Z axes radiating from such origin. LH and RH indicate Left Hand and Right Hand sides of the vehicle respectively. FR and RR indicate Front and Rear end of the vehicle respectively. Common internationally used abbreviations are used in this application, such as, EV: Electric Vehicle, BMS: Battery Management System, DC: direct current, AC: alternating current, BIW: Body-in-white, VCU: Vehicle Control Unit, TEG: Thermo Electric Generator, TENG: Tribo Electric Nano Generator, NVH: Noise, Vibration and Harshness; VAWT: vertical axis wind turbine; HAWT: horizontal axis water turbine; BMS: battery management system; VAWT: vertical axis wind turbine assembly

BACKGROUND OF THE INVENTION AND DESCRIPTION OF RELATED ART

Environmental concerns, high fuel costs, and depleting fossil fuel reserves have been instrumental in driving a global want for energy independence in the automotive sector. While conversion to alternative fuel supplied vehicles including hybrid, plug-in hybrid and all EVs has been one sure move marked by nearly all major automobile manufacturers, these technologies remain far from directly harnessing green energy sources or renewable energy sources. Hence, there is yet a pressing demand for technology that can ably sustain and otherwise supplement and fortify the energy requirement of said alternative fuel supplied vehicles and going beyond to self-powered vehicles not relying on grid power.

Solar-powered EVs are one promising avenue capable of addressing the want voiced above. The state-of-art today in its parlance is inundated with gross deficiencies including that these systems work only when strong sunshine is available. Furthermore, only outermost surfaces of a vehicle (formed by panels such as roof, side body/side door, front fender, front hood, and rear trunk) can be used to fixedly mount solar cells via permanently bonding or other means, which arrangement essentially implies that orientation of the solar panels is always coincident with the orientation of said surfaces and surface area exposed therein to sun's rays is limited by the dimensions of the surface and also as per the vehicle's design-adding to that, solar cells available today have anyway a limited energy conversion efficiency of around 18% to 20% which consequently implies that one full day of parking under the sun translates roughly into only a meager tens of kilometers of extended driving range for a car passing roadworthiness standards, which is far below what a practical solution needs to offer. Taking cue, the applicant hereof summarizes an important issue that needs to be addressed as being the limitation of solar cells alone being the sole feed to batteries of alternative fuel supplied vehicles.

Prior art, to the limited extent presently surveyed, does not. list a single effective solution embracing all considerations mentioned hereinabove, thus preserving an acute necessity-to-invent for the present inventor who, as result of his focused research, has come up with novel solutions for resolving all needs of the art once and for all and to achieve an entirely self-powered EV. Work of the presently named inventor, specifically directed against the technical problems recited hereinabove and currently part of the public domain including earlier filed patent applications, is neither expressly nor impliedly admitted as prior art against the present disclosures.

A better understanding of underlying principles of the present invention will be obtained from the following narration which sets forth an illustrative yet-preferred embodiment.

Objectives of the Present Invention

It is a primary objective of the present invention to provide an effective multidisciplinary system, which when integrated or otherwise outfitted on-board with an automobile, or stationary application, is capable of efficiently harnessing diverse sources of renewable energy as well as bio-mechanical energy for imparting or ceasing motion of said automotive vehicle as well as enabling a predominantly self-powered electric vehicle.

Yet another objective of the present invention is to allow harnessing a combination of energy from at least eight different green or renewable energy sources namely: 1) Solar energy, 2) Rainwater, 3) Wind energy, 4) Geo-Thermal energy of road surfaces, 5) thermal energy due to Greenhouse Effect in vehicle interiors (primarily from solar energy), 6) bio-mechanical energy provided by occupants (ingress-egress, bouncing due to road vibrations, operating vehicle controls, 7) kinetic energy of tyre's sidewalls flexing and unflexing during tyre rolling motion, 8) thermal energy recovery from Brake Discs, for harnessing electrical energy to replenish the charge in a traction battery including auxiliary battery and/or ultracapacitors in order to drive an EV with high level of overall energy efficiency. The end-usage of the surplus battery energy includes but not restricted to V2L (vehicle-to-load) charging, (customer's personal devices) and V2G (Vehicle-to-Grid) supply.

Yet another objective of the present invention is to establish and increase the energy self-sufficiency, and become predominantly self-powered.

Yet another objective of the present invention is to eliminate completely or at least minimize the running cost of the vehicle by tapping freely available renewable energy sources from the environment, and also feed the surplus energy back to grid using V2G protocols, creating Revenue Generation in excess of cost of grid power consumption.

Yet another objective of the present invention is to minimize or reduce the frequency and amount of grid charging otherwise required by EV's, thereby significantly contributing to reducing "range anxiety", customer time devoted to charging, and increasing customer convenience by renewable self-charging.

Yet another objective of the present invention is to augment and significantly increase solar energy conversion together with wind and ambient thermal energy conversion.

Yet another objective of the present invention is that integration of the on-board system so provisioned is designed to meet regulatory safety standards of the vehicle, and with a minimal effect on aerodynamic drag.

Yet another objective of the present invention is that the on-board system so provisioned does not have a dependency only on the constant availability of strong sunlight for harnessing solar power.

Yet another objective of the present invention is that the on-board system so provisioned is made amenable to solar tracking to allow optimal recovery of solar energy throughout the day.

Yet another objective of the present invention is that the on-board system so provisioned is made amenable to inter-dependencies and utilizes software architecture to not only deploy the devices in the invention but also to save energy consumption by disabling or reducing the functions of certain other electrical consumption in the vehicle.

The manner in which the above objectives are achieved, together with other objects and advantages which will become subsequently apparent, reside in the detailed description set forth below in reference to the accompanying drawings and furthermore specifically outlined in the independent claim(s). Other advantageous embodiments of the invention are specified in the dependent claim(s).

BRIEF DESCRIPTION OF DRAWINGS

The present invention is explained herein under with reference to the following drawings, in which.

The above drawings are illustrative of particular examples of the present invention but are not intended to limit the scope thereof. The drawings are not to scale (unless so stated) and are intended for use solely in conjunction with their explanations in the following detailed description. In above drawings, wherever possible, the same references and symbols have been used throughout to refer to the same or similar parts, as under—

| | |
|---|---|
| 01- | Roof unit |
| 02- | Roof of car |
| 03- | main solar panel/cassette |
| 04- | supplementary solar panel/cassette |
| 04a- | Front supplementary panel/cassette |
| 04b- | Rear supplementary panel/cassette |
| 04e- | Main solar panel assembly |
| 05- | rotatable shaft |
| 06- | micro-water turbine |
| 07- | wind turbine |
| 08- | structural frame for (07) |
| 09- | Cap |
| 10- | Handle |
| 11- | Frame "A" |
| 12- | Frame "B" |
| 13- | tilting hinge |
| 14- | rack-and-pinion and lever arrangement |
| 15- | TEG layer of (04) |
| 16- | pin and latch arrangement |
| 17- | turbine blades |
| 18- | generator |

Though numbering has been introduced to demarcate reference to specific components in relation to such references being made in different sections of this specification, all components are not shown or numbered in each drawing to avoid obscuring the invention proposed.

Attention of the reader is now requested to the detailed description to follow which narrates a preferred embodiment of the present invention and such other ways in which principles of the invention may be employed without parting from the essence of the invention claimed herein.

STATEMENT OF THE INVENTION

The present invention is identified in cohesively harnessing several renewable energy resources for generating/recuperating usable electrical energy. A preferred embodiment herein is localized to a vehicular use-case, in which are integrated inter-operational modules which help to generate/recuperate electricity from sunlight, wind, falling water, heated road surfaces, spatial heat from greenhouse effect within the vehicle, biomechanical forces exerted by occupants of the vehicle and within components of the vehicle when in operation.

DETAILED DESCRIPTION

Principally, general purpose of the present invention is to assess disabilities and shortcomings inherent to known systems comprising state of the art and develop new systems incorporating all available advantages of known art and none of its disadvantages. Accordingly, a mechanical solution in form of a retractable, foldable, and modular system is proposed herein which, when fitted to a vehicle, is capable of energy conversion from the aforementioned sources.

Figure 1:
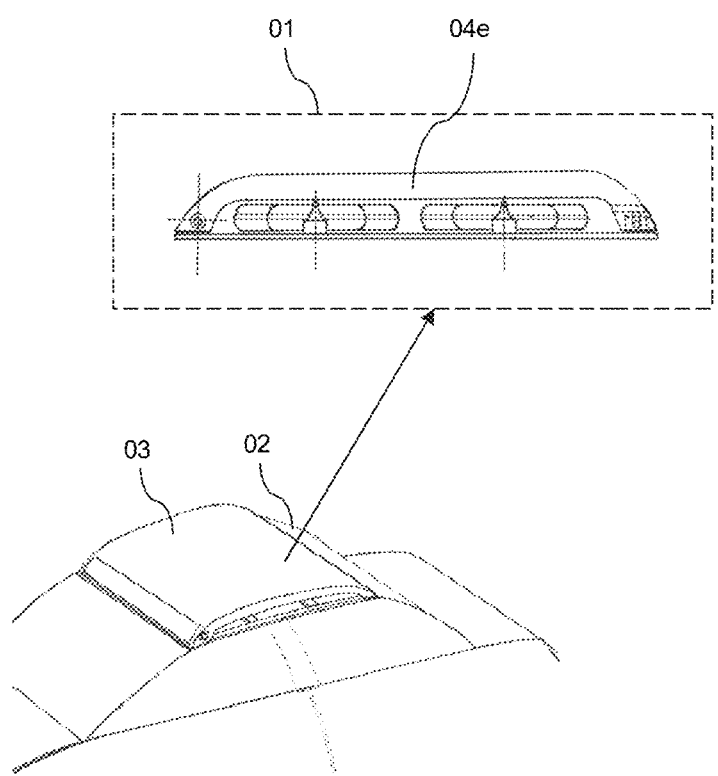
FIG. 1 is a schematic drawing to show the fitment of a solar stack (01) atop the roof (02) of a car.

Harvesting solar power from incidental sunlight-As seen in the accompanying FIG. 1A, a roof unit (01) is fitted, via adhesive bonding/nut-bolting or equivalent means, on the roof (02) of a car such that the weight of the roof unit (01) is transferred onto the main body of said car.

The solar stack (02) is designed such that it can be installed as an OEM fitment during production of new cars, or alternatively installed by retro fitting to an existing car/vehicle.

Figure 2A:
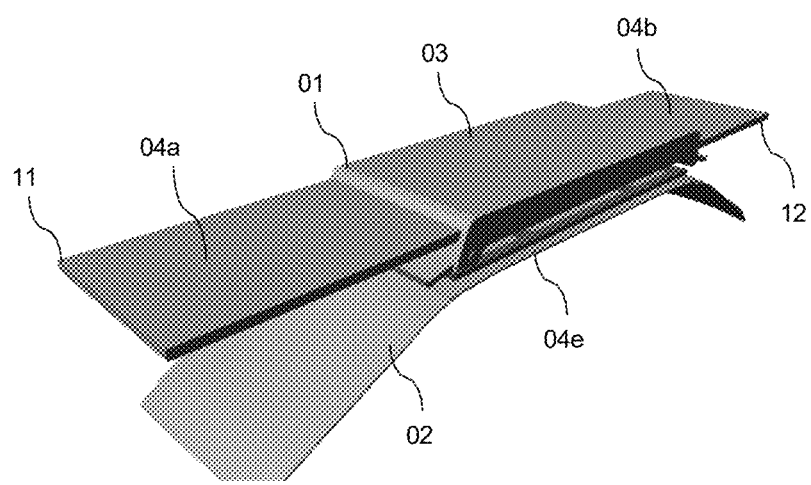
FIG. 2 (A to G) showcases construction and assembly of the solar energy harvesting system of the present invention.

As shown in FIG. 2A, the roof unit (01) includes a more than one distinct and separate solar panels-one main solar panel (03) and a plurality of supplementary solar panels (shown by common numeral 04) in cassettes that are extendable, termed as "upper" and "lower" (as per storage position) or alternately "Front" and "Rear" (as per part of the vehicle flanked when extended out). The plurality of supplementary solar panels (04) are moveable and extendable by means of tracks or rails and arranged one atop the other which help in overriding the limitation of surface area imposed by dimensions of the roof of the car on which the roof unit (01) is mounted. This significantly increases the available surface area to obtain additional area for the conversion of renewable energy to electrical energy.

In another aspect hereof, the supplementary panels (04) can be slid out/extended from the roof unit (01) and also twisted for optimized orientation (solar tracking) as per the direction of sun's rays changing constantly during the day. This is for maximization of surface area exposed perpendicularly to sun's rays, leading to significantly higher energy conversion into electrical energy as compared to unmovable or fixed surface area constructs of solar panels found in state-of-art. A lateral benefit of this design is to reduce direct heating of the passenger cabin interiors due to greenhouse effect and thus reduce air-conditioning energy consumption when the solar cassette is extended in the front. The air-conditioning power consumption is significant for cars/EVs (of the order of 2.5 KW depending on the vehicle).

As shown in FIG. 2A, the supplementary solar panels (04) can be extended forward, and rearwards as well in the direction of the vehicle longitudinal axis and predominantly in horizontal direction. As will be appreciated from this execution, surface area of the solar panel is not limited by the roof area of the car but in fact is significantly increased. By this way, an increase of more than 100% of roof area is feasible, thereby directly translating into a more than 100% increase in solar energy conversion and resultant range of the EV as compared to prior art. This invention thus solves a major challenge for self-charging of EV's.

Figures 2B, 2C:
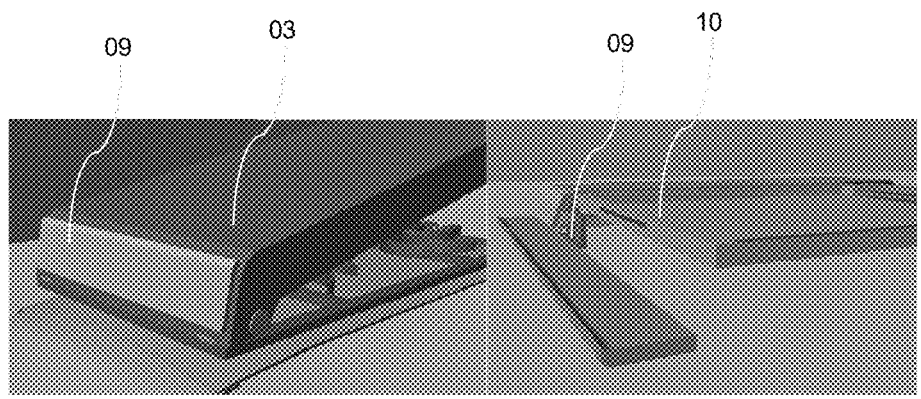

In another aspect hereof explained with reference to FIGS. 2B, 2C and 2D, a front and a rear cap (shown by common numeral 09) are provisioned for allowing the stack to open to thereby enable a user to pull out the front and rear solar stack cassettes respectively. A handle (shown by common numeral 10) is incorporated simply as a slit in Frame "A" (11) and Frame "B" (12) to enable a user to pull or push the corresponding supplementary solar panel cassettes in or out of the solar stack assembly/roof unit (01) to thereby cause them to alternate between their extended and retracted configurations. Frame "A" (11) and Frame "B" (12) together slide to and fro on rollers provided inside the housing of the roof unit (01).

Figure 2D:
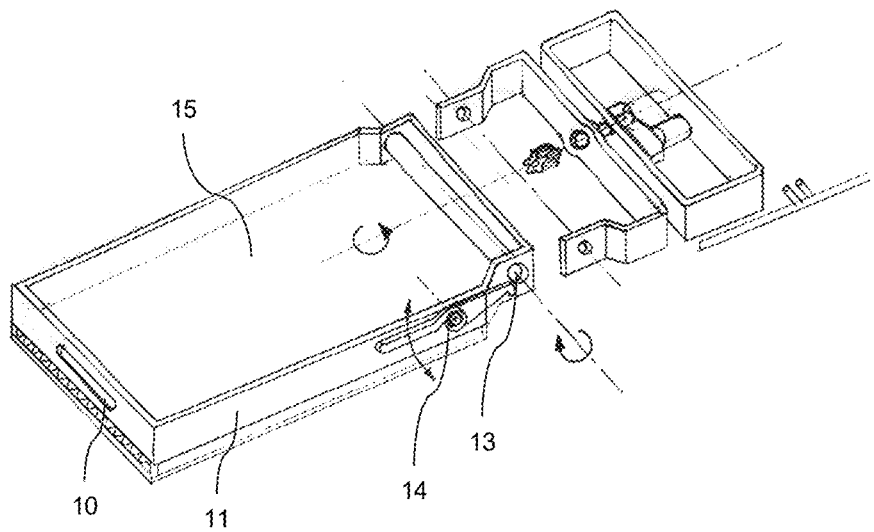

With continued reference to FIG. 2D, it can be seen that in an extendable cassette corresponding to either of the front or rear supplementary solar panel cassettes, a tilting hinge (13) with corresponding rack-and-pinion and lever arrangement (14) is provisioned to connect while in a slidable manner with the housing of roof unit (01) to facilitate the swivelling and position locking of the front or rear supplementary solar panel cassettes about the longitudinal axis of the vehicle ("X" axis), such swivelling being additional to tilting about "Y" axis. Sliding out is facilitated by means of rollers applicable to both the front or rear supplementary solar panel cassettes. Maximum extended position is limited by stoppers (not demarcated in the drawings). Solar energy is continuously harnessed by main/top solar panel (03) and TEG film (15) integrated into the plurality of supplementary solar panels when the vehicle is in motion and cassettes are retracted.

Figure 6A:
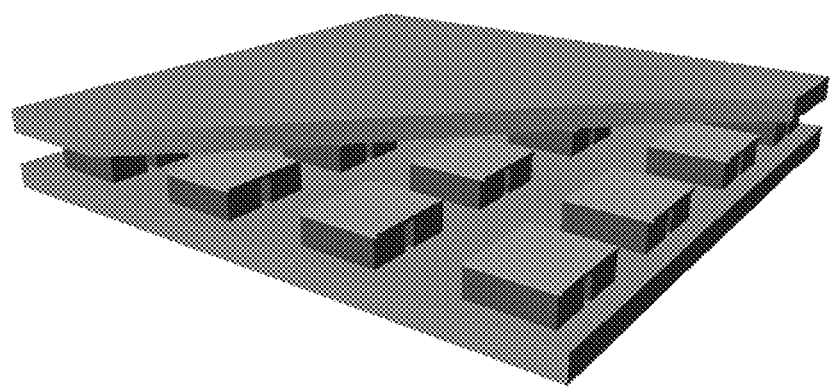
FIG. 6 (A to C) is a schematic illustration of TENG film construction of the present invention.
Figure 6B:
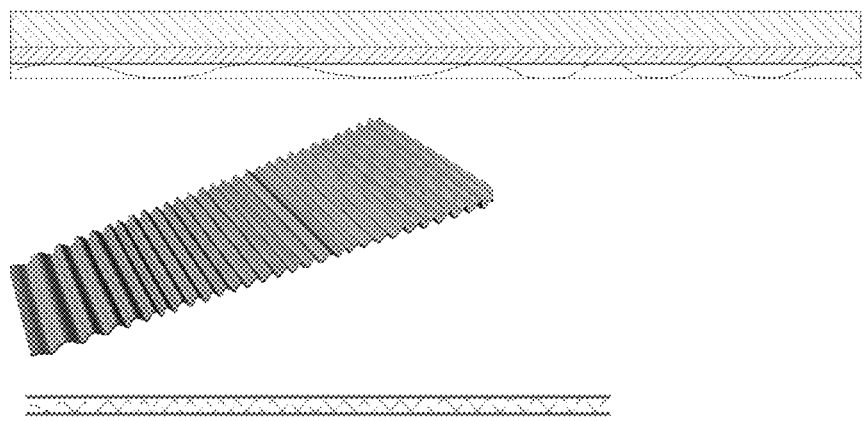
Figure 6C:
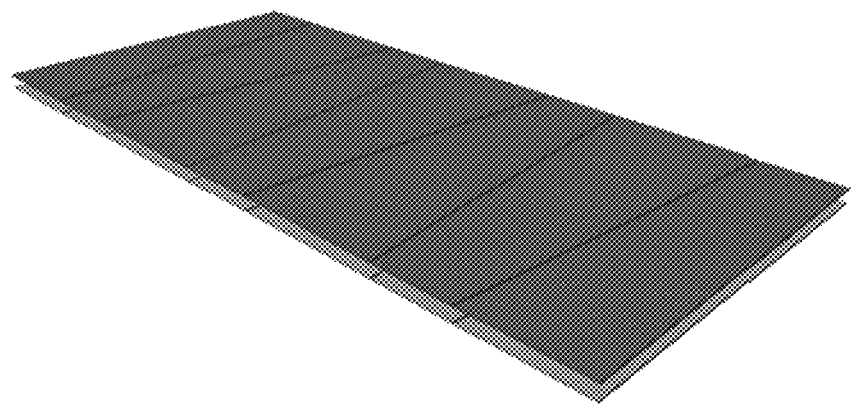

Prior art describes a flutter type TENG as comprising a top and bottom layer of metal electrode (commonly Aluminium) and an intermediate membrane (usually PTFE material) that vibrates or flutters whenever wind blows through the gap between the electrodes strip, thus creating electricity by induction. It is pointed out herein that prior art Flutter type TENG's suffer from a disadvantage that some of the electrical charges generated tend to cancel each other out when more than one part of the membrane contacts the two electrode modules at the same time. This is due to prior art TENG's having equal width of rectangular or square shaped electrodes across the entire length. It is a claim of this invention to overcome this drawback with a Flutter-TENG having a multiplicity of trapezoidal shaped electrodes, each of which are joined together in opposed directions so as to form an overall rectangular slab form factor as shown in the accompanying FIG. 6 (A to C). This forms a bulk stack wherein membrane charges would not cancel each other on a given strip as the widths are different all along the length of strip and higher conversion efficiency. Thus, the Solar Stack harnesses a combination of solar energy, thermal energy as well as wind energy simultaneously.

Figure 7A:
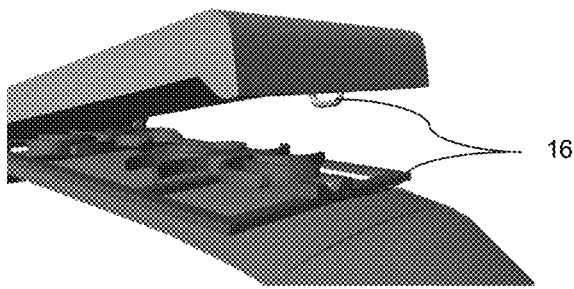
FIG. 7 (A to C) showcases the locking mechanism included in the roof unit (01) as included in the present invention.
Figure 7B:
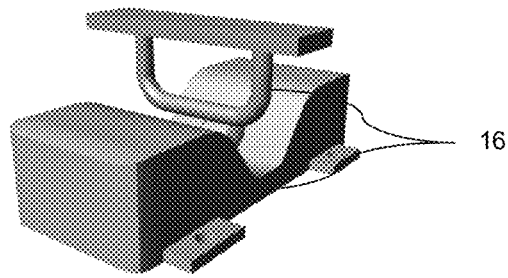
Figure 7C:
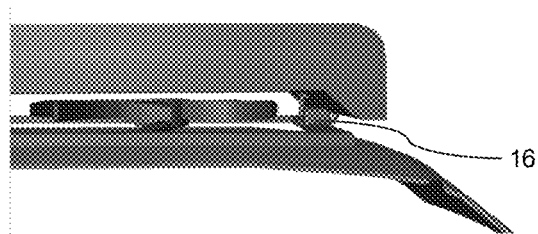

As seen in FIGS. 7A, 7B and 7C, the solar stack assembly as a whole is locked into roof unit (01) via the pin and latch arrangement (16), in a securely latched condition, also to meet vehicle crash requirements. This front Hinge designed in such a manner as to get inserted inside the Solar Panel Stack Assembly. The benefit of this arrangement is realized in that—a) the hinge appearance is improved, it is concealed inside the Roof Unit. b) During vehicle collisions such as Frontal crash impacts, the entire Solar Panel Stack Assembly will be better restrained by the Hinge protrusion. c) The loads acting on the Hinge fixed to Frame pass through to the vehicle roof and to the main vehicle body-in-white.

According to another aspect hereof, the extension and retraction of supplementary panels (04) from the roof unit (01) is controlled at instance of the user (such as driver of the car) by either among manual or automated means. The automated means include a control switch panel provided within reach of the user, by actuation of which the supplementary solar panels (04) can be electronically extended and reversibly retracted back into place within the stack, and thus locked in place by means of a remote device (such as a key FOB etc.) so that the supplementary solar panels (04) are allowed to deploy only when the car is parked/stationary and not when the car is started/in motion.

Figure 3A:
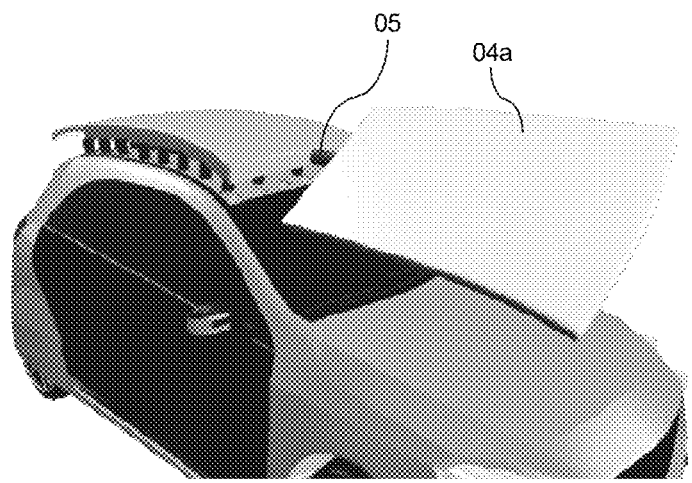
FIG. 3 (A to C) showcases differential orientation of the solar panels included in the system of FIG. 2.

As shown in FIG. 3A, each of the supplementary solar panels (04) are connected and thereby extendable from the roof unit (01) by means of a sliding brackets coupled with shaft (05). The main unit (01) receives the shaft (05) via a bearing to thus allow rotation of the shaft (05) and hence tilt/rotate the supplementary solar panels (04) giving the functionality of superior 'sun tracking' and thereby superior energy conversion for a longer duration of the day (when the sun dips before and after noon). In contrast, prior art designs cannot rotate according to the sun's orientation.

Figure 3B:
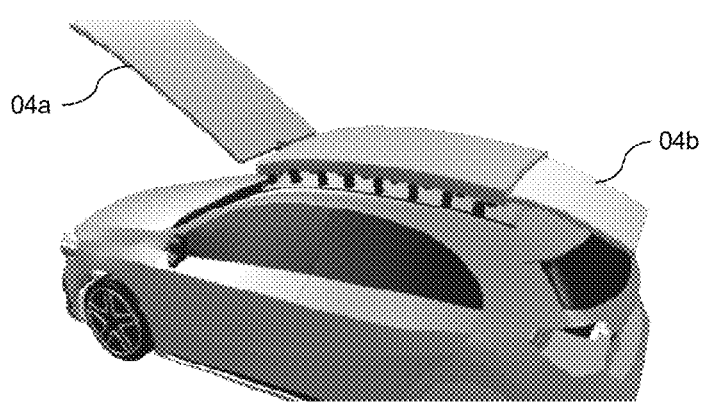

As seen in FIG. 3B, the front extended supplementary solar panel (04*a*) can be swiveled upwards or downwards and the rear extended supplementary solar panel (04*b*) can be swiveled upwards or downwards to better orient towards sun's rays for efficient energy conversion.

Figure 3C:
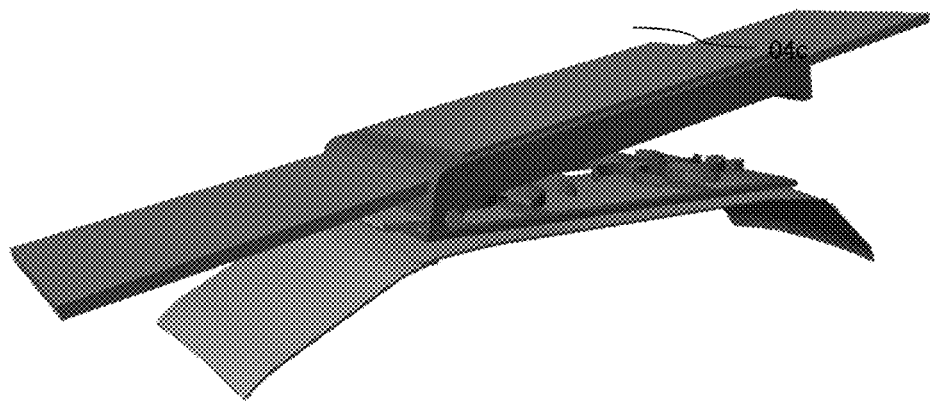

As seen in FIG. 3C, the entire solar stack assembly (excepting the wind turbines) can be swiveled at an angle (around the front hinge shaft axis) and locked in position. This ensures that all the three solar panels including the Fixed Solar Panel are enabled for solar tracking, this is applicable for the frontal direction only, along Y-axis.

Additionally, the supplementary solar panels (04*a* and 04*b*) can be swiveled about a horizontal axis based on a software program linked to the sun's position (that is, solar tracking) with respect to the GPS location of the vehicle, significantly increasing energy capture.

It shall be appreciated that the supplementary solar panels (04*a* and 04*b*) also help in blocking the sun's rays from entering through the large glass areas mainly the front and rear windshields, thus significantly reducing the greenhouse effect whereby the interiors of the vehicle are heated up. The estimated reduction in temperature of interior parts is 20° C. for a closed vehicle such as passenger car. The extended panels also help in avoiding the need to bond the solar panels to the front hood, rear trunk, side doors, and back doors. This invention taken together with the claim that it can be retracted vertically into the vehicle's Roof Line significantly improves aesthetics and the serviceability compared to prior art solar powered vehicles.

Figure 2E:
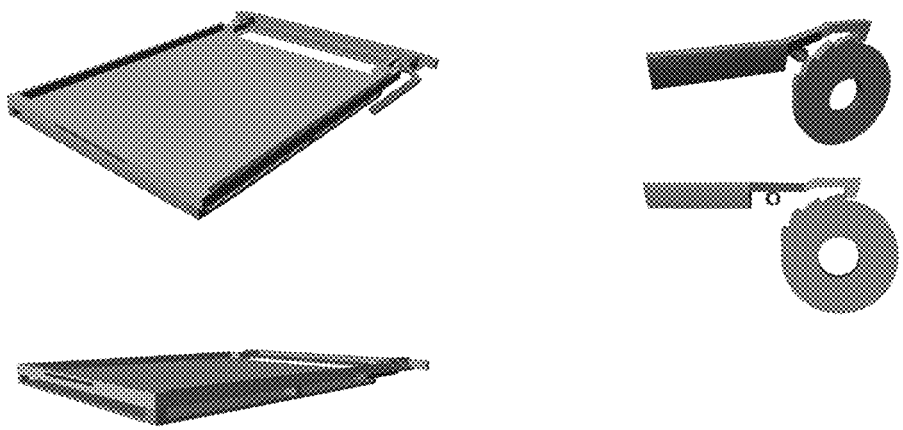
Figure 2F:
Figure 2G:
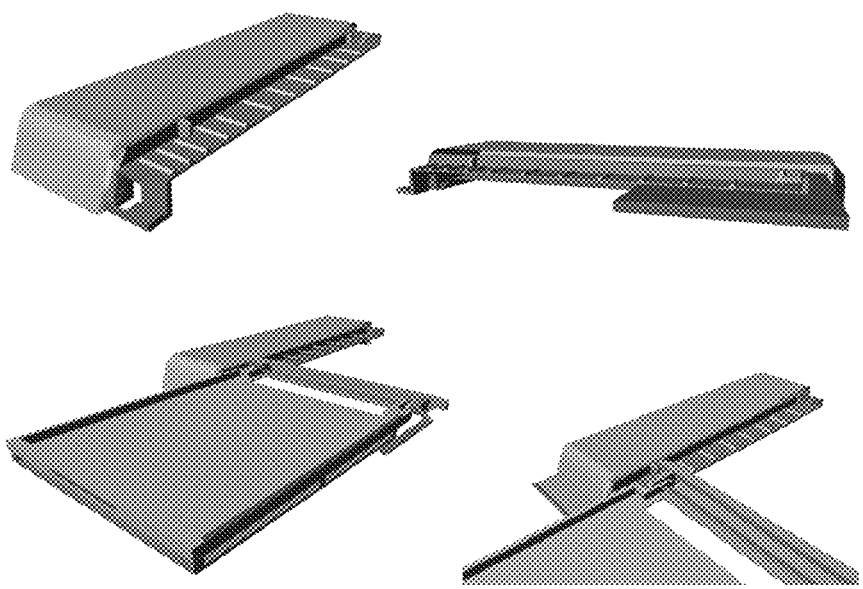

As shown in FIG. 2E, the solar stack consists of three (3) layers: a) the first being a Solar array (photovoltaic cell), b) the second being a TEG Film (Thermo Electric Generator) affixed to lower surface of each Solar panel array such that the Hot Side of TEG film contacts the Bottom Surface of hot photovoltaic film, and the Cold side of TEG film is exposed to the third layer at a lower temperature, c) the third layer being an integrated thin layer of Trapezoidal bulk modules of 'Flutter type Tribo Electric Nano Generator (TENG). Such a 3-layer sandwich construction increases the efficiency of solar energy conversion significantly.

The $2^{nd}$ layer, TEG, harnesses the thermal energy of heated solar panel which would otherwise go waste as heat, thus adding to the Photovoltaic conversion efficiency.

The overall efficiency for the fixed solar panel and extended solar panels is a sum total of the efficiencies of the purely photovoltaic conversion (usually 18-20%) and TEG conversion (usually 10~15%), leading to a high Net maximum conversion efficiency up to 35% and potential to even go beyond 40% using advanced material technologies. The $3^{rd}$ layer (Flutter type TENG) is fixed below the TEG multi-layered bulk strip. Energy of winds flowing/blowing below the cassette (when the solar cassette is extended) and irrespective of wind direction, are captured and converted into electrical energy based on the principle of electrostatic induction.

According to another aspect hereof, the roof unit (01), is in alternative embodiments, fabricated into a curved shape conforming to the shape of the car's roof panel curvature.

It shall be appreciated that the fitment of the roof unit (01) as provided above can be applied with suitable localizations (of mainly dimensions and geometry) to the roof of other type of vehicles such as buses, trucks, and 3-wheelers. In case of 2-wheelers, the solar stack may be fitted predominantly on the sides of the vehicle.

Harvesting the Kinetic Energy of Falling Rainwater

According to another aspect hereof showcased in FIGS. 4A to 4C, the tiltable solar panel stack described hereinabove channels a concentrated flow of rain water when falling thereon (direction of rain illustrated by block arrows and flow of such collected rain water flowing along sides of the vehicle being shown by simple arrows). The main solar panel assembly (4*e*) is provided with perpendicular edges along the length to prevent water from flowing out from the sides and guide the entire water into the windshield and turbines. Similarly, the rain water falling on the rear windshield/glass is channeled to flow through water turbines placed below a rear grille of the trunk lid area of the vehicle. For Safety, the turbines under the Front Hood as well as Rear Trunk Lid are separated by rigid sheets/panels in the BIW (not shown) in order to prevent any inadvertent accessing or touching by users/customers.

Figure 4A:
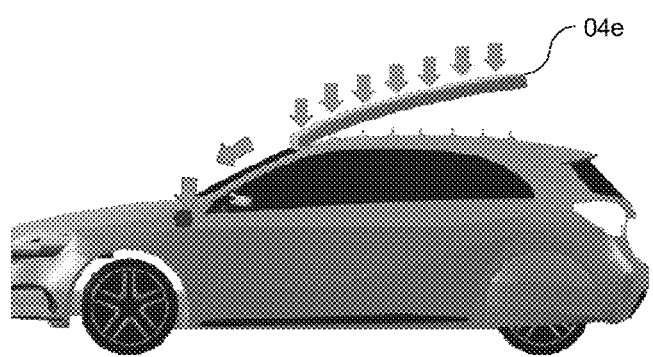
FIG. 4 (A to C) showcases the construction and assembly of the rainwater energy harvesting system included in the present invention.
Figure 4B:
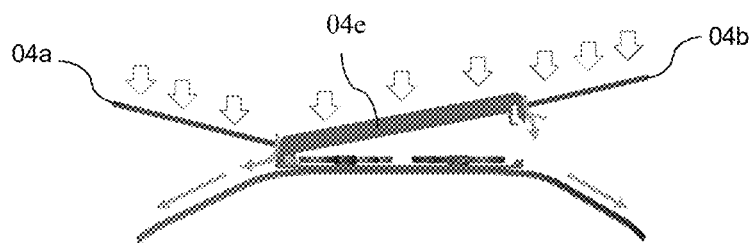

As shown in FIGS. 4A and 4B, the main panel assembly (04*e*) of the roof unit (01) is swiveled upwards to allow the water falling on the large area of the solar stack and extended supplementary panels to get collected and flow onto the windshield and onto the array of water turbines placed underneath as will be explained later in this document. The main panel assembly (04*e*) may be held in such upward position by means of a stay rod or equivalent (not shown in the drawings). Here, supplementary solar front panel (04*a*) need not be retracted outside and may be contained inside the main roof unit (01).

Figure 4C:
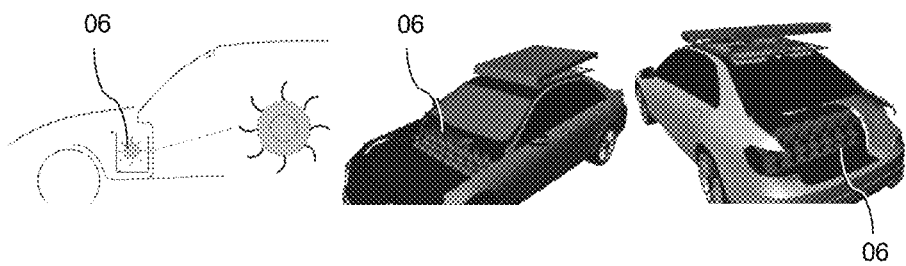

As shown in FIG. 4C, the system proposed herein includes a HAWT assembly comprising a single or array of connected micro-water turbines (Kaplan turbine) shown by common numeral 06) fitted in the vehicle which receive the said channel for conversion of kinetic energy of running water into electrical energy during rain falling onto the roof and back side of the vehicle. As seen here, one or more HAWT assemblies with generator(s) are placed under front hood and forward of dash panel or firewall of the vehicle. Here, said single or array of connected micro-water turbines (06) is mounted on a common shaft and placed well below the front windshield and front hood of the vehicle in order that they also meet pedestrian safety regulations for passenger cars. Another set of water turbines (06) are placed below the rear trunk lid of the vehicle. Thus water flowing onto the front and rear windshields can be effectively harnessed by the respective turbine/s under the hood and trunk respectively for converting kinetic energy of running water into electrical energy.

When the vehicle is moving, the solar stack assembly is horizontal (not rotated upwards), and most of the water flowing down on windscreen is captured by the blades of the HAWT. HAWT axis of rotation is juxtaposed below Front Windshield in vertical Z direction, and forward of front dash panel and cowl in X direction, such that water falls on upward facing blades and not on the downward facing blades so as to convert maximum kinetic energy. Said AC generator sends electric current through a circuit to an AC-DC Inverter and then to BMS. When vehicle is parked in stationary condition for a sufficient amount of time, solar stack assembly is tilted upwards to capture additional significant area of falling water, this increases the Kinetic Energy capture and subsequent conversion to electrical energy. The HAWT captures falling water not only from rainwater but also in car washing operation.

According to another aspect hereof, the plurality of HAWT's may have a common shaft and driving a Generator. Turbine blade profiles and a number of blades are optimized for the specific application, estimated volume of water. Special water flow channels are designed-in in the Body parts such as Front Cowl to direct the water onto the turbine blades. The shafts are mounted on brackets fixed on the Vehicle's BIW Crash Structure or Beam so as to absorb impact energy and undergo desirable deformation during various vehicle collision scenarios such as Frontal Crash, Offset Crash, Side Impact, Oblong Impact, and so on. This invention improves the Crash performance of EV's by providing a collapsible energy absorbing system under Front hood and under Rear trunk lid in the form of HAWT. The HAWT is juxtaposed well beneath the Front Hood with a good vertical distance to the Hood surface in order to meet all Pedestrian Impact regulations for passenger vehicles. Sketch shows the juxtaposition of the turbines with respect to front windshield, and vehicle body components such as front dashboard and cowl, objective being to maximise the water falling on blades facing upwards.

According to another aspect hereof, the water turbines may be similarly fitted in the Rear of the vehicle in the luggage compartment and separated from the passenger compartment by the Back Frame of the Rear Seat as well as separated from the Luggage compartment by a rigid sheet/panel designed in order to pass Rear Luggage Retention Crash requirements and Rear Impact. Single or plurality of HAWT's are placed under-rear trunk lid. These may have a common shaft or multiple shafts such as to drive a generator. Turbine blade profiles and number of blades are optimized for the rear trunk volume space, and estimated volume of water. Special waterflow channels are designed-in in the Body parts such as rear trunk cross-members to direct the water neatly onto the turbine blades. The HAWT including shafts are mounted on brackets fixed to the vehicle's BIW underbody members so as to absorb energy and undergo deformation in the event of vehicle undergoing a Rear End collision and/or side impact.

According to another aspect hereof, the solar panel assembly explained before, can be rotated for Rainwater energy harvesting. This includes a roof unit having a curved profile which predominantly matches with the curvature of the vehicle's Roof surface and any other surfaces presented by the vehicle. The drawings accompanying this specification show a predominantly straight shape for frame of wind turbine and Solar Panel Assembly, but other geometries (and other contours as per shape of the automobile body so as to avoid any unnecessary gaps) are intended to be covered, without major divergence from the principles hereof. Rubber/polymer material mounts are juxtaposed suitably between the frame and roof of vehicle so as to absorb and minimize vibrations of wind turbine and Generator from getting transferring to the vehicle. The solar stacks are securely latched and locked in position inside the roof unit during vehicle motion. Thus, the design is made in such a way as to provide conformance to vehicle crash performance in various regulatory tests such as frontal, front offset, rear impact, side impact, oblong impacts and so on.

The mechanism for fitment and deployment of the solar panel assembly and the rainwater energy harvesting system are laid out above. While being put to use, the Solar Stack Assembly is first de-latched and then rotated to a suitable angle (such as 20 degrees) and locked in position. This captures the falling rainwater. or water falling in a Car washer on its entire roof area. The water stream flows onto the Water Turbines placed below the Windshield and Front Cowl of vehicle. In this manner, the Solar Stack Assembly directly assists the operation of the Water Turbines when solar radiation is absent. When the automobile is in a stationary condition, the Assembly is tilted and locked at a particular angle with the help of a stay rod (similar to a stay rod of a Front Hood of a vehicle). The stay rod is be folded back by user into the Solar Panel Assembly when the vehicle is driven, such that the Solar Panel Assembly is latched securely with the RR Latch system. In another embodiment, a Motorised system provides the rotation of the solar stack as well as enables latching and un-latching, and the manual stay part is eliminated.

As seen here, the Solar Stack Assembly is first de-latched and then rotated to a suitable angle (such as 20 degrees) and locked in position. This captures the falling rainwater. or water falling in a Car washer on its entire roof area. The water stream flows onto the Water Turbines placed below the Windshield and Front Cowl of vehicle. In this manner, the Solar Stack Assembly directly assists the operation of the Water Turbines when solar radiation is absent. When the automobile is in a stationary condition, the Assembly is tilted and locked at a particular angle with the help of a stay rod (similar to a stay rod of a Front Hood of a vehicle). The stay rod is be folded back by user into the Solar Panel Assembly when the vehicle is driven, such that the Solar Panel Assembly is latched securely with the RR Latch system. In another embodiment, a Motorised system provides the rotation of the solar stack as well as enables latching and un-latching, and the manual stay part is eliminated.

As will be appreciated by the reader from the foregoing narration, the front and rear turbines convert the kinetic energy of running water into electrical energy. In case of AC Generator, the electricity is routed through an AC-DC converter and into the battery management system of the vehicle.

Thus, the HAWT are active and capture energy when rainwater flows down the Front Windshield and Back glasses areas. Energy harnessing continues even when the vehicle is in a 'washer facility'. The energy of falling water in large volumes is captured by the HAWT.

Figure 5A:
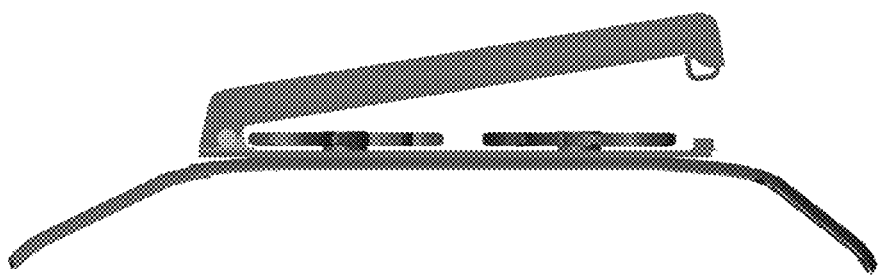
FIG. 5 (A to C) showcases the construction and assembly of the wind energy harvesting system included in the present invention.
Figure 5B:
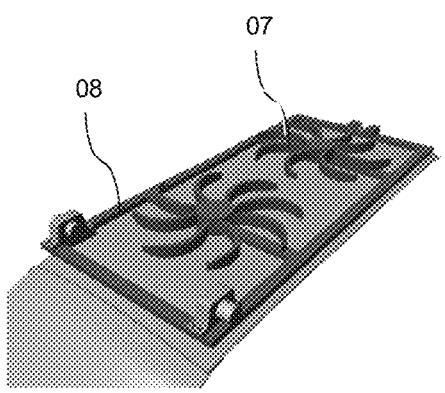
Figure 5C:
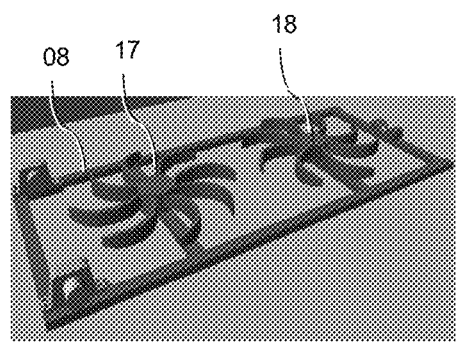

Harvesting the kinetic energy of flowing air/wind According to another aspect hereof showcased in FIG. 5a VAWT comprising one or more instances of a vertical axis wind turbine (shown by common numeral 07) is fitted within a chassis/frame (08) on the roof unit (01), beneath the main solar panel assembly (4e). The roof unit (01) is designed to connect the main solar panel assembly (4e) and the assembly (07) in a hinged manner, which arrangement has the advantages that: a) solar panels face the sun un-hindered while the cross-winds can to flow in a parallel path through the wind turbines, b) any direction of cross-winds would flow predominantly across the width of the car in Y-axis, c) minimal vertical space is occupied as compared to a horizontal axis wind turbine or other arrangements. Thus, energy generation happens continuously even in absence of sunshine, including cloudy, rainy and/or snowy conditions.

As seen in this assembly comprises a structural frame (08), turbine blades (17), and a generator (18) at hub of the turbine blades (17), which are affixed by means of RR latch system with cable release. This assembly consists of a single or multiplicity of wind turbines with curved blades profiles which is optimized for diameter size and juxtaposed in such a manner as to maximise the available area according to a vehicle roof, that generate electrical energy during flow of cross-winds across the roof of the vehicle, which is available during rainy conditions and independent from the presence or absence of sunlight. This assembly harnesses wind energy both when vehicle is stationary and in moving condition, and performs a dual function of cooling the Solar Panel extendable arrays Upper and Lower. by allowing cross-winds flowing beneath the solar panels, and partly by the rotating action of the blades themselves.

The RR Latch System with cable release mentioned above consists of a single or plurality of latches fixed to the frame of Wind Turbine Assembly. Robust Latch Pins which are bolted to Solar Stack Assembly and hence can move up or down when the entire assembly is rotated. A cable release mechanism provided on the RR Latch system enables the user to disengage the latch/latches. The same can also be operated by an electrical actuator from inside the vehicle. When the Solar Stack Assembly is brought down (about the front hinge axis), the latch pin fixes into the groove of the latch and the Solar Stack is locked securely. The advantage claimed is to prevent disengagement of Solar Stack Assembly during vehicle movement or vehicle impact scenarios.

The wind energy harvesting sub-system elaborated above includes an additional arrangement of wind energy generators, such as rotating TENG blades brushing against stationary metal electrodes but not excluding other devices such as axial flow turbines and all other type of devices that convert wind energy into electrical energy, which are equally efficient in conversion of wind energy into electrical energy irrespective of wind direction.

In another embodiment hereof, the entire roof unit (01) including wind turbine assembly explained above is designed to be retracted downwards (by actuation of servomotors) under the vehicle's roofline into a recessed compartment that is sealed off from the interior passenger cabin. When renewable energy is to be harnessed, the roof unit (01) is un-retracted to a position above the vehicle's roofline. In this case: (a) the upper surface shape and profile of Roof Unit is matched exactly to the Styling of the vehicle's roofline; (b) Ingress protection (water, dust) are prevented by suitable beading etc; (c) retraction into vehicle roof presents a unified smooth surface for longitudinal airflow, especially at vehicle's high speeds thereby reducing aerodynamic drag as compared to previous embodiments. As shall be appreciated by the reader, the added advantages of this embodiment are that (a) styling design of the vehicle is preserved especially when this becomes a high priority; (b) The vehicle's overall packaging constraints are met by keeping the height of roof unit (01) as low as possible, and by matching the lower surface of the roof unit (01) with the interior roof liner profile, and maintaining the interior headroom for occupants; (c) If necessary, the overall height of vehicle is adjusted. However, a compromise herein is that the energy required to retract and un-retract the roof unit (01) into the car roofline needs to be subtracted from the total energy generated from renewables.

As will be appreciated by the reader, the solar stack assembly and vertical axis wind turbine assembly are integrated in a roof-top unit which has an integral shaft that enables the whole unit to be rotated about a Y axis passing through the hinge (fixed securely to Wind Turbine Assembly and roof of the vehicle). It has a Rear Latching arrangement for occupant safety during vehicle motion and impact scenarios.

Thus, the VAWT harnesses the energy from the cross-winds blowing across in most directions (except along the longitudinal axis of vehicle) when the vehicle is either moving on the road or is stationary.

Harvesting energy of drafts created by other vehicles moving in the vicinity Traffic Wind Energy is generated by "other vehicles" moving parallel to the vehicle such as in the opposite direction. While Traffic Powered Wind Turbines on road on stationary structures/installations comprise prior art, there has been no conscious effort to implement a device on a vehicle. This invention helps capture wind energy from traffic moving in the opposite direction without increasing drag resistance, whether the car is parked alongside the road or is moving. It is well-known that vehicles coming from the opposite direction such as a Trucks, Buses, Vans bring along with them a significant mass (and velocity) of airflow. A significant amount of energy can be harnessed by the turbines in present embodiment. Only a rough estimate can be made at this time regarding the Traffic Wind Energy harnessed over a 24 hours duration.

Harvesting Thermal Energy from the Hot Road Surfaces

Figure 8A:
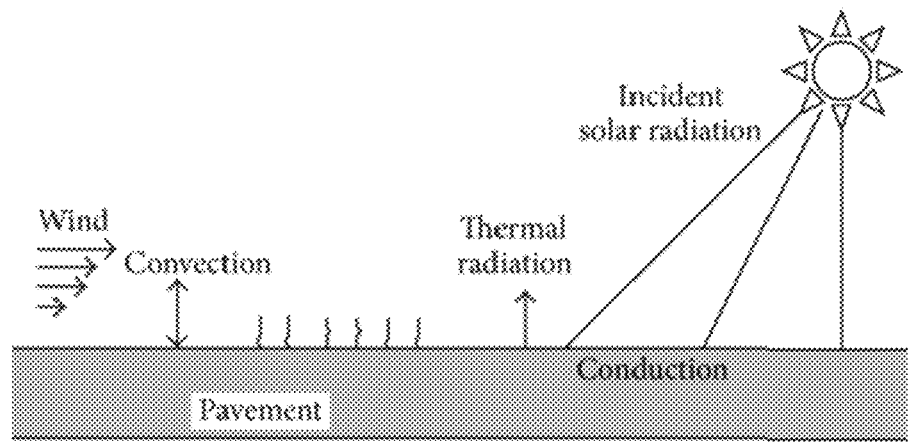
FIG. 8 (A and B) showcases the construction and assembly of the road-surface thermal energy harvesting system included in the present invention.
Figure 8B:
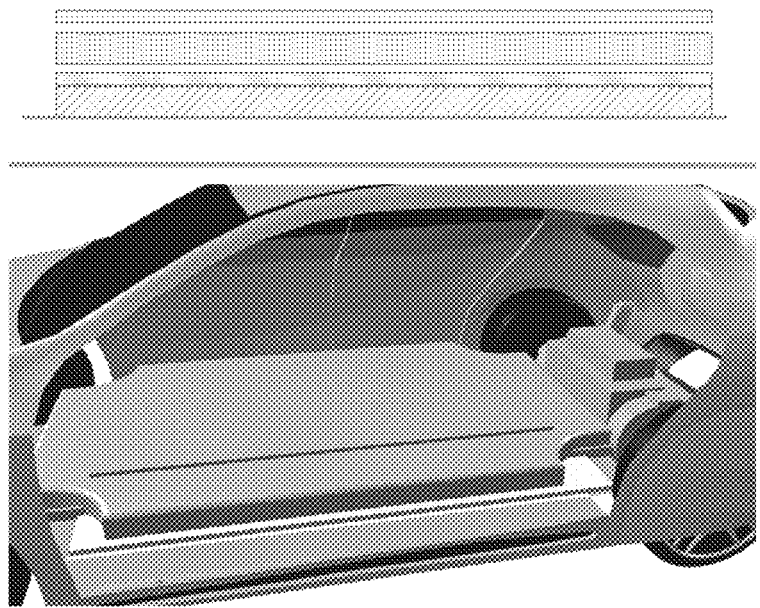

FIGS. 8A and 8B show the construction, fitment, and orientation of the road surface thermal energy recuperation system as per the present invention. This system includes a thermoelectric generator working on the Seebeck Effect (012) which recovers and converts thermal energy from a hot road surface below the underbody of vehicle into electrical energy which then goes to charging the Traction battery. Thermoelectric generators are used from common art and they comprise of solid-state devices without moving parts, wherein a difference in temperature between hot and cold thermocouples produces a voltage (current).

High temperatures such as 70° C.~80° care attained by road surfaces at high ambient temperatures in excess of 35° C. in tropical climates, coupled with strong solar radiation. This is harnessed for converting into useful electrical energy by fitting a large TEG film to the underbody metallic cladding (protection sheet for traction battery in electric cars). The metal sheet absorbs significant amounts of thermal radiation from the road surface when the car is parked is parked (and also while moving). This thermal energy is transferred to the hot side of TEG thermocouple which attains a higher temperature as compared to its upper or cold side. A suitable air gap may be provided above the TEG film and under the lower surface of the battery. The electric currents generated from TEG film is routed through a dedicated wiring harness to a DC-DC converter connected to the BMS.

The thermoelectric generator (012) (also referred to as TEG) is a flat rectangular shaped thin film or bulk module comprising a plurality of semiconductor plates acting as Thermoelectric Generators, as well as including emerging technologies such as sprayable paint (such as Tin Telluride). New emerging technologies in the public domain such as Na-TECC (sodium-Thermo-Electro-Chemical Converter) can also be used with the rectangular plate to absorb and convert thermal energy with increased efficiency of upto 15%. The thermoelectric generator is juxtaposed in the underbody of the vehicle including a position just below the main battery pack. In another embodiment, a Retractable swiveling arm with a metal conductor tip drops down when the vehicle is stationary and contacts the hot road. The Arm is electronically retracted prior to the vehicle being put in motion. The TEG film's Hot side takes on the temperature of hot road while the cold end of thermocouple is at the temperature of inside of the cabin at 25° C. It shall be appreciated that dimensions exposed to the hot road surface can be increased/extended to cover maximum surface area possible in the vehicle underbody. As commonly known, asphalt/cement road temperature can go upto 70° C. to 80° C. when the ambient temperatures are in the range of 40 to 45° C.

During operation of a EV, the Stator of a Traction Motor can reach maximum temperatures such as 110~120° C. (depending on vehicle and driving conditions), while the ambient temperatures can be anywhere from sub-zero or 0° C. to a maximum of 47~50° C. in very hot climates, thus providing a good temperature difference, this increases the efficiency of TEG to harness thermal energy. TEG films are affixed suitably to the outer surface of Stator Housing. A TEG film is wrapped around or bolted or fixed suitably to the Stator of a Traction Motor, so as to cover maximum surface area. Such a TEG film would be having a Hot side thermocouple contacting the high temperature Stator of Motor, and the cold side thermocouple exposed to surrounding/ambient temperature.

Harvesting Thermal Energy from Greenhouse Effect

Similarly, as above, electrical energy can also be harnessed from solar radiation causing greenhouse effect and increased thermal energy of vehicle interior dashboard, through use of TEG film which is affixed such that hot side of thermocouple is contacted with the bottom of a metal sheet or to the bottom underside surface of the dashboard itself, in order to significantly increase the temperature. The other cold side of thermocouple is exposed to vehicle's interior air which is usually at a much lower temperature. In another embodiment of the invention, the upper surface of vehicle dashboard is given small perforations/holes to allow a metal sheet below to get heated up by the solar radiation. When TEG is fixed on such a metal sheet, it further increases the temperature and conversion efficiency of TEG. The DC current generated by TEG film is routed through a wiring harness to a DC-DC Converter and then to the BMS.

Figure 9A:
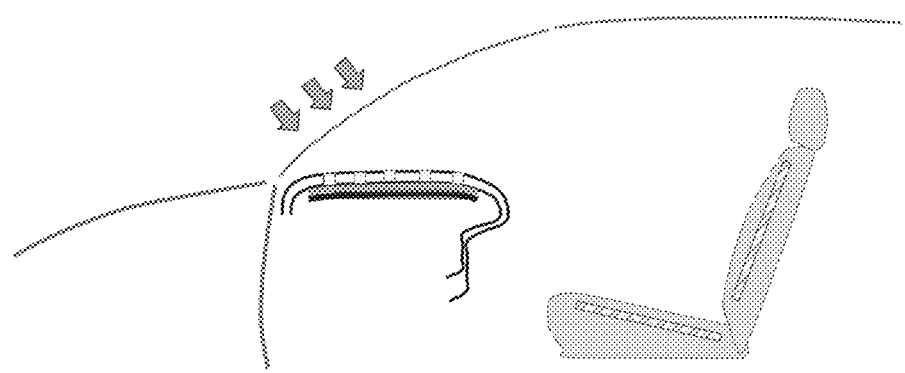
FIG. 9 (A to C) showcases the construction and assembly of the recuperation system for greenhouse effect thermal energy and occupant-generated bio-mechanical energy as included in the present invention.
Figure 9B:
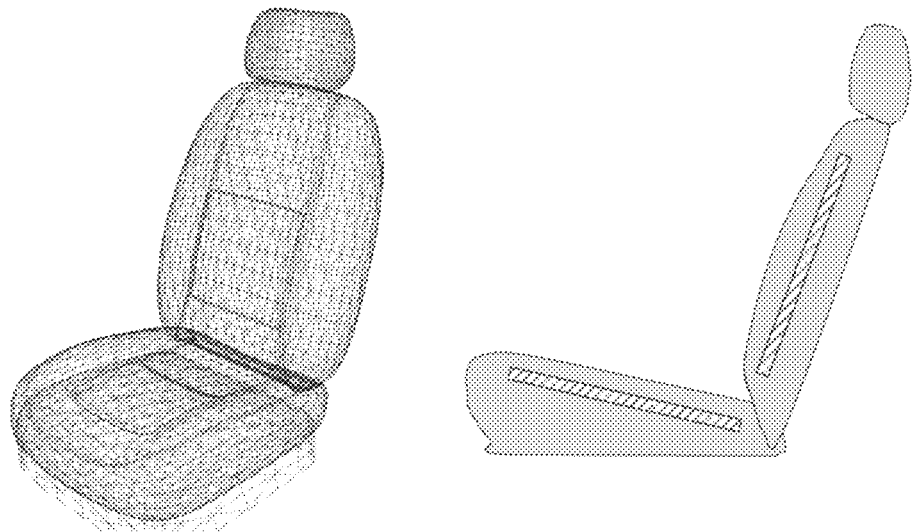
Figure 9C:
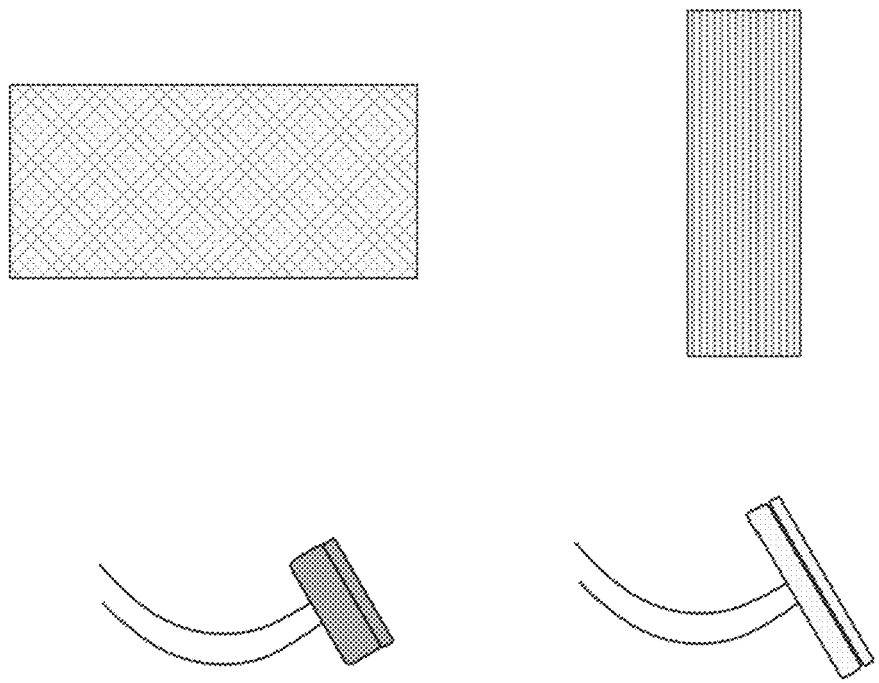

Harnessing the kinetic energy exerted by the occupants of the vehicle According to another subset of the preferred embodiment hereof the system proposed includes Tribo Electric Nano Generators (TENG) to convert bio-mechanical kinetic energy of occupants into electricity in situations such as but not restricted to the following scenarios:
 a) Passengers' Ingress-Egress into and out of the vehicle
 b) Any bounce/jounce action on seats due to vehicle cornering/turning, and Road undulations such as potholes and speed breakers.
 c) Pressing of brake and accelerator pedals FIGS. 9A and 9B show the construction, fitment, and orientation of the Triboelectric Nano Generator (TENG) integration for recovery of kinetic energy exerted by the occupants of the automobile. TENG film is fitted in all seats in the vehicle and used to harness kinetic energy of occupants sitting on seats when entering a vehicle. Getting up from the seat when leaving a vehicle, and bouncing on seats during vehicle motion and cornering. The TENG film in the form of a mat of suitable thickness (say 50 microns) is embedded inside a water-proof polymer envelope. The TENG film envelope is stitched to the cover/trim under the seat cushion and inside seat back. 4) In another embodiment, the TENG mat is co-moulded during the Seating Foam moulding process. Image shows a typical cross-section, applicable to all other Seats in the vehicle. The AC current generated by TENG is routed through a dedicated wiring harness to an AC/DC inverter and to the BMS.

As mentioned before, the present invention additionally proposes the recuperation of bio-mechanical energy from brake and accelerator foot pedals. For this, multilayered TENG's are mounted on driver side foot pedals, which help to harness the mechanical energy of driver pressing the brake and accelerator and convert it into electrical energy.

Furthermore, Triboelectric Nano Generator (TENG) film is fitted over the base thickness of Accelerator and Brake Pedals of EVs and used to harness kinetic energy of occupants pressing on them several times while driving. The TENG film of suitable thickness (say 50 microns) is embedded/glued/affixed on the outer surface of foot pedals and these films are contacted by the driver's feet. The frequent operation of pedals results in significant Electrical Energy harvesting from Kinetic Energy due to forces exerted on the pedals. The electrical energy is fed nu a wiring harness through an Inverter to the BMS.

Recuperating Energy from Mechanical Stresses in Vehicle's Tyres

Figure 10A:
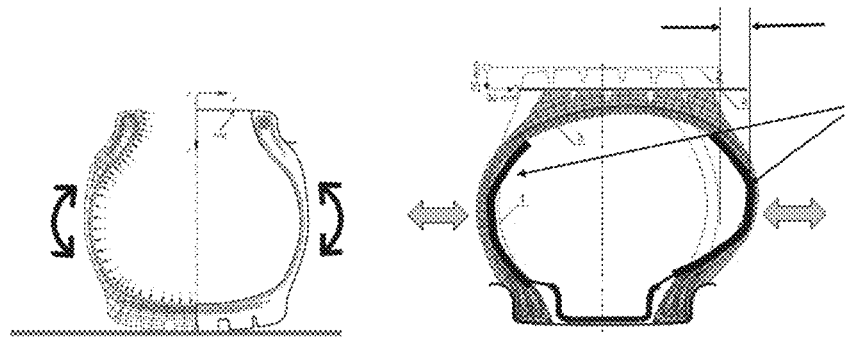
FIG. 10 (A to C) showcases the construction and assembly of the tyre mechanical deformation/stress energy recuperation system included in the present invention.
Figure 10B:
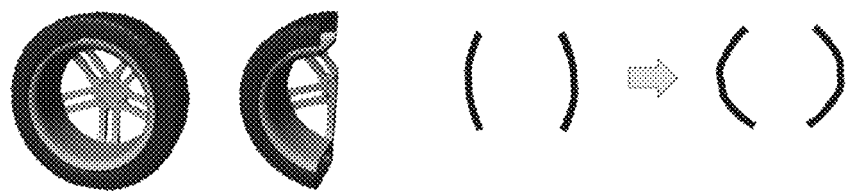
Figure 10C:
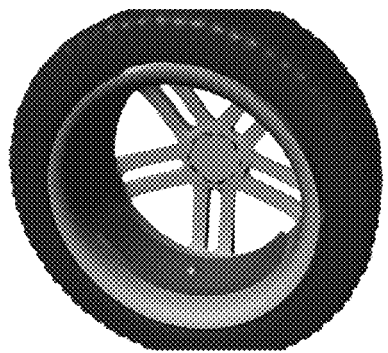
Figure 11D:
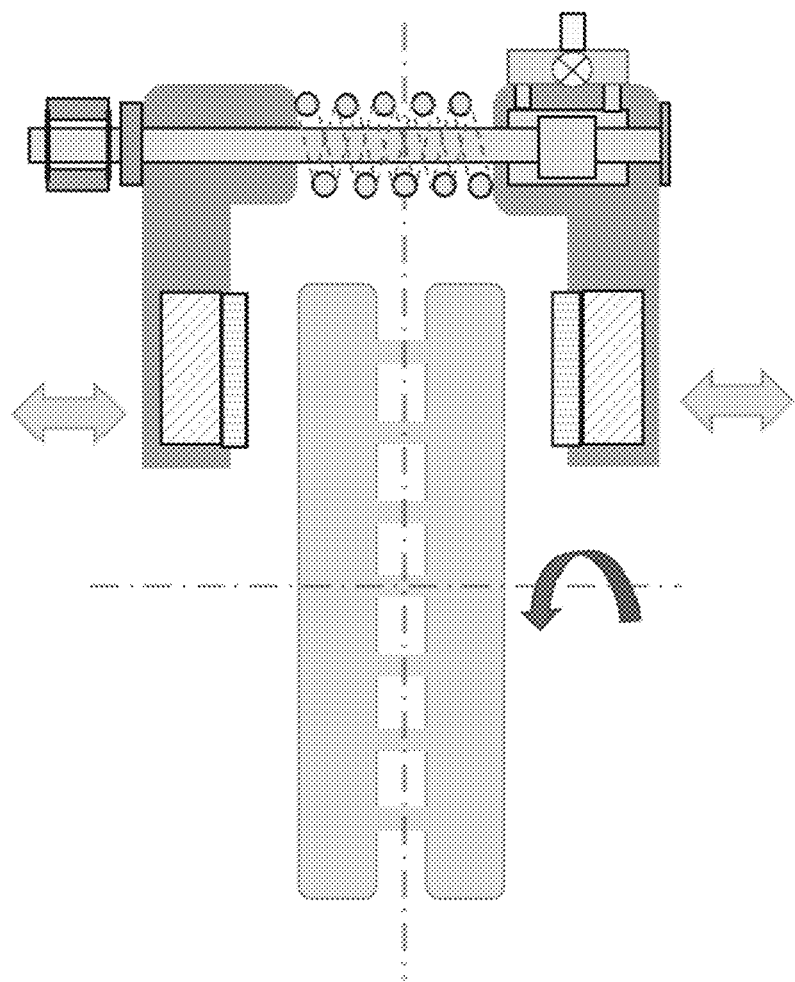
FIG. 11 (A to D) showcases the construction and assembly of the brake energy recuperation system included in the present invention.

According to another aspect hereof, the system proposed herein includes TENG to convert the mechanical energy due to flexing of sidewall of tires during vehicle motion. As shown in the FIGS. 10A, 10B and 10C, multilayered TENG module is fitted suitably by adhesion or co-molding onto the inside of sidewalls of the tyres, in other words on the inner and outer sides of tyre and inside the enclosed space of the tyres and wheels.

It has been published in prior art that TENG films with conductive cloth electrodes has been adhered to Silicone rubber by laser etching process. Therefore, in this invention, the construction and fixing of TENG to a tyre's rubber sidewalls is practically feasible and comprises of a layer of FEP (fluoroethylene polypropylene) and PU (Polyurethane) as dielectric elements, each of them mounted on respective conductive cloth electrodes.

Also, the fixing integration done inside the tyre carcass protects the TENG from direct exposure to external debris, mud, snow, water etc. It is well known that sidewall flexing or deformation occurs on a continuous basis on every rolling tyre. Maximum deformation occurs at the bottom zone of tyre contact patch and the tyre rebounds to a state of minimum deformation at the opposite zone (top portion). Every instant, different and consecutive portions of the tyre sidewalls undergo cyclic deformation, flexing and un-flexing when a vehicle is moving in a straight line. During cornering, one half of the sidewall undergoes larger deformation and flex than the other half at the cross-section corresponding to contact patch.

It is a claim of this invention to harness this continuous and significant source of energy. The inventor also wishes to point out that while TENG-integrated Tyre has been published in prior art, the same has been fixed on the tyre tread pattern and not on sidewalls. The tread pattern directly contacts the road surfaces and therefore prior art is prone to suffer from major drawbacks of wear and tear, extreme high temperatures and varying humidity, and also poor life due to harsh conditions acting at the tyre-to-road interface. Whereas this invention addresses these drawbacks and integrates TENG on the tyre's inner space and sidewalls.

This invention claims a method to uniformly and continuously collect the current generated from the TENG's on the sidewalls. A single concentric metal ring of material such as Aluminum and having a U-shaped cross-section is fitted onto the 'wheel well portion'. This is an area not exposed to abrasion and weathering as it is fully enclosed by the tyre. The entire circular edges of the 'U' connect physically with the two TENG's on both sides and current is collected based on the TENG's deformation. A metallic slider with small spheres contacts the wheel well from the outside of the wheel and routes the electrical energy via AC-DC converter to the BMS.

Recuperating Energy from Disc Brake Calipers

According to another subset of the system proposed herein, as shown in FIGS. 11A to 11D, the system hereof includes a Thermoelectric Generator (TEG) bulk module incorporated innovatively to harness thermal energy using a supplementary TEG Caliper from a heated Brake Disc when the vehicle is stationary and/or in Parked condition.

Prior art research has well established that Energy Dissipation in passenger car brake disc is higher than energy dissipation is brake pads.

However prior art inventions comprise of TEG materials integrated on disc pads and not on Disc itself. The integration of TEG on Brake Pads has a big disadvantage of reducing the effective friction area of original Pad materials, this affects braking safety. In addition, the main heat zone is the Disc and not on the Brake Pads.

The present embodiment overcomes the drawbacks of prior art as enumerated in the following aspects of the invention—
a) TEG Floating Calliper comprises of Copper Pads juxtaposed on either sides of each Brake Disc independent of the brake calliper in order to establish face contact and conduct heat efficiently away from disc in a temporary condition of vehicle being stationary (as in a traffic junction for a given time duration) or otherwise in Parked Condition as sensed by Parking Brake sensor (signal from which can be determined and understood as a trigger/stimulus for actuation of this sub-system). The reader shall understand that these callipers are distinct and separate from Brake callipers of the vehicle.
b) TEG's Hot side thermocouple contacts the Copper Pads.
c) The Cold side thermocouple is in contact with internal recess of Calliper body which in turn is exposed to cooler ambient air.
d) In this way, TEG module is well-protected from direct exposure to a harsh environment in the area of Brake Disc.
e) Upon receiving a software signal that vehicle is stationary, the Activation Rod draws the moving calliper and fixed calliper together. This brings both copper plates in contact with Brake Disc, limiting to a small force, Activation rod separates the moving and fixed calliper creating the 'gap' just prior to vehicle beginning to move.
f) Low amount of Hydraulic pressure can be used for activation, this draws energy from driver's foot pedal operation acting via a brake booster. This method avoids drawing electrical energy from main battery. In an alternate embodiment, other means such as electromagnetic actuator may be used since power consumption is small.

Therefore, the invention provides ability to have a large area of TEG material to come in contact with brake disc, enabling a good amount of conductive heat transfer to the hot side of thermocouple of the TEG (cold side heat sink being exposed to ambient air).

Electrical Architecture

As can be now appreciated, the present invention provides a high degree of interdependence and synergy established between the aforementioned different modes of energy harvesting, namely Solar Panel stacks, TEG modules, Flutter-TENG modules, vertical axis wind turbines and horizontal axis water turbines, and Triboelectric nano generator modules. The electrical architecture for their integration into a vehicle comprises—
a) DC output: from Solar panels, and all TEG bulk modules
b) AC output: from Wind Turbines and Water Turbines (if it is a AC Generator)
c) AC output: from Flutter-TENG and other TENG modules
d) Each electrical output is routed through its respective wiring harness connection, DC outputs to DC-DC and AC outputs to AC-DC inverter followed by DC-DC converter. Final DC converted energy is routed into the BMS. The BMS decides between charging the Traction Battery or Auxiliary Battery or Ultracapacitor (if provided) or to charge other V2L devices (vehicle-to-Load) or V2G (vehicle-to-grid) protocol.

Additionally, the present invention covers several possible realistic scenarios for Energy harvesting, following examples are only representative: 1) Vehicle is parked and stationary for a long period, any combination of sunshine, wind, rain, hot road surface, 2) Vehicle is on-road, any combination of sunshine, rain, wind created by other traffic vehicles driving past in opposite direction, natural crosswinds, hot road surface, 3) Vehicle starting/stopping motion involves any combination of occupants ingress-egress, jounce, depending on road surface and driving, 4) Vehicle parked in Snow for long period, with or without winds.

As may be appreciated further, it is possible to tilt and lock the supplementary solar panel cassettes (04a and 04b) at different angles during the day, to harness more solar energy, as shown in the accompanying drawings. It is also possible to tilt the solar stack assembly. Also, the extended cassettes also act as a shield for Front windshield and back glass from receiving solar radiation, this greatly minimises greenhouse effect and heating up of vehicle interior cabin, thereby reducing significant energy required for air-conditioning when the vehicle is started up. Thus to envisage—
a) When the cassettes (04a and 04b) are extended horizontally, they capture solar energy leveraging the increased area of exposure. TEG film acts in conjunction with solar panels. The extended cassettes also act as a shield for Front windshield and Back glass from receiving solar radiation, this greatly minimises Greenhouse effect and heating up of vehicle interior cabin, thereby reducing significant energy required for air-conditioning when the vehicle is started up.
b) During snowfall, day/night, when the vehicle is in parked condition, solar energy may still be captured if there is accompanying sunshine. Meanwhile, the extended cassettes act as a shield for Front windshield and Back glass. This helps in keeping a clear glass surface when the vehicle is started up for the next drive. This also reduces significantly the Heating Energy consumption for operating glass Defrosters which drain the EV battery.
c) In case of sunshine intermittent with snow, the extended solar cassettes get heating up by solar radiation. This helps to melt the snow falling on them, making it more convenient to retract the cassettes (04a and 04b) back into the roof unit (01) when the vehicle is to be started up again.
d) VAWTs continue to work at all times during winds accompanying snow, irrespective of whether vehicle is parked or is moving.

e) TEG film in underbody cladding harnesses thermal energy from road surface at high temperature during high ambient.

In another embodiment providing for the aforementioned cause of several realistic environmental scenarios, the present invention can be arranged to manifest as under—
a) The Solar Stack Assembly can be tilted, without extending the solar panel cassettes (04a and 04b);
b) Cassette (04a) can be independently tilted upwards and locked in position, while the Solar Stack Assembly can be tilted at an angle and locked in position, and cassette (04b) can be extended along the same direction or at another suitable upward angle. The invention ensures a strong interdependency between the Solar panels and Water Turbines, thus significantly enhancing the water catchment area as compared to using only the Roof Area;
c) Water impinging (white arrows) on Cassette (04a) and Roof Unit flows via the gap onto the windshield and the HAWT water turbines under Front Hood, while the water impinging on Cassette (04b) flows via the gap onto Back Glass and the HAWT water turbines under Rear Trunk
d) Energy of cross-winds is captured by the wind turbines as well as Flutter-TENG modules under the extended solar cassettes (04a or 04b).

Synergy Between Components

The unique inter-dependency between various innovative functionalities of this invention is described below with a few examples only, which are representative but not restrictive—
1) Interdependency between TEG of Solar Panel and TEG of Dashboard: for example, if sunshine is replaced by cloudy weather/dark clouds or rain, the 3 Nos. TEG sensors of Roof Unit and solar cassettes would together show a lower current output. This is due to lowered temperature of solar panel bottom surfaces. At the same time, the Dashboard TEG would also record a lower temperature. The combined signals sent to VCU would help draw a conclusion about a change of weather. In addition, time duration can be a data input with a clock function. The combined data can be used by software algorithm to draw a conclusion. The logic is used to detect reversible changes like sunshine to cloudy weather and/or rain, or darkness at night and back to sunshine. Accordingly, the VCU can send signals to micro-motors to activate or retract and fold down the Solar Stack assembly and so on. It is recognized that some amount of battery power would be consumed in such automatic operations, however Artificial Intelligence and superior algorithms would be deployed to balance the overall energy usage to ensure a net positive harnessing of energy.
2) Seat TENG acts as Occupant sensor: The TENG fitted under seat covers gives a signal through BMS to VCU whether there is an occupant sitting on a particular seat. Based on magnitude and number of electrical signals (1 to 5), signals from all Seat TENG's enable an Artificial Intelligence based conclusion based on data, whether there is only 1 or more occupants in the vehicle. Accordingly, an output decision is taken, (algorithm and AI based):
    Decision 1: if occupant has done an ingress as per TENG signal, decision is that vehicle is about to start moving. Signal is conveyed through VCU to micro-motor of Solar Unit and Stack to retract the solar panels cassettes CSA-FR and CSA-RR and lock to latches. Vehicle 'ON' is then activated.
    Decision 2: Signal is conveyed through VCU to the HVAC system (heating, ventilation, and air-conditioning) as a whole, and in particular to the electrical compressor of HVAC. If there is only 1 driver, for example, the electrical power supply from Battery to compressor is reduced, and also the air vents or louvers for other passenger locations are closed up. This helps automatically conserve energy for the whole vehicle, which otherwise would not be possible or very difficult to achieve.
    Decision 3: Signal from Dashboard fitted TEG may indicate very high temperatures due to greenhouse effect of parking under the sun. Then, driver and any other occupants entering the vehicle may need high air-conditioning in the beginning. Accordingly, a combined signal from TEG as well as Seat TENG's are sent to VCU, which can then take a decision to for high initial amount of air-conditioning power, followed by reducing the power supply (to compressor from Battery) after a pre-determined time like 10 minutes.
3) Wind Turbines and Flutter-TENG acts as cross-wind sensor: The magnitude of electrical energy output from wind turbine can also be used by software using simple algorithms/AI to gauge whether it is safe to drive in the face of a heavy cross-wind blowing across the road or highway, and give an alert warning to driver and occupants of the vehicle. Accurate measurements of wind velocity should also be possible to display on vehicle's Instrument cluster or HMI (Human Machine Interface) on a live basis. This would add extra safety and appeal to customers.

FURTHER COMPONENTS/EMBODIMENTS

Further, it is a claim of the invention that all the devices in their various configurations as applicable for cars as well as other types of transport vehicles and stationary applications, can be deployed not only manually but also automatically using electronics, software controls and motors/micromotors. Physical actions for enabling activation of Solar Cassettes, for example, can be driven by VCU's working on control algorithms. The algorithms incorporating fuzzy logic and other logics are supplemented by inputs from a multiplicity of sensors (see below). Further, the software and controls functionality is improved by Artificial Intelligence and Machine Learning and IoT. The sensors include but are not restricted to commercially available ones such as a) Rain sensors, b) wind direction sensors, c) solar radiation sensors, d) GPS, e) ambient temperature sensors, f) humidity sensors, g) vehicle motion sensors, h) parking sensor, i) traffic sensor, j) BMS State-of-Charge signals, k) Motor Control Unit (MCU), l) day-night sensor, m) ambient lighting illumination sensor.

It shall be understood however that the invention scope includes not only the juxtaposition as per the accompanying drawings but all other positions and locations on the vehicles where it is possible to mount the energy conversion subsystems.

Figure 12A:
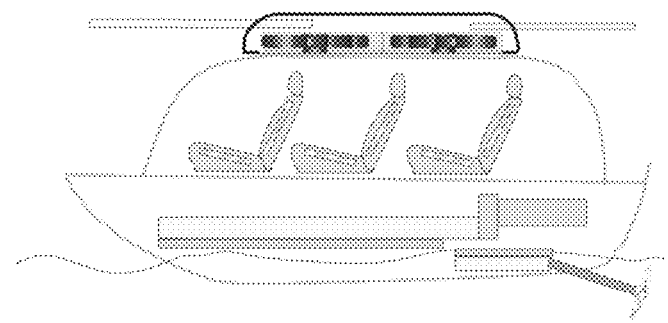
FIG. 12 (A to C) showcases the construction and assembly of the present invention when applied in diverse application environments.

For example, FIG. 12A shows the alternative energy harvesting system of the present invention when outfitted to a boat/yacht. Concept of roof unit, solar stack assembly, are effective for all types of vehicles and also marine vessels. The TENG films applied to seats are particularly effective for high amount of kinetic energy recovery due to the usually high degree of occupants up and down bouncing when a boat moves on water. Due to longer length available in front and rear, the extendable Solar panels can be extended for a longer length as compared to an automobile, thus harnessing larger amounts of solar radiation. The integral wind turbine assembly is expected to generate even higher energy than on-road due to the usually free winds blowing over water and at high velocity on seas and large water bodies.

Figure 12B:
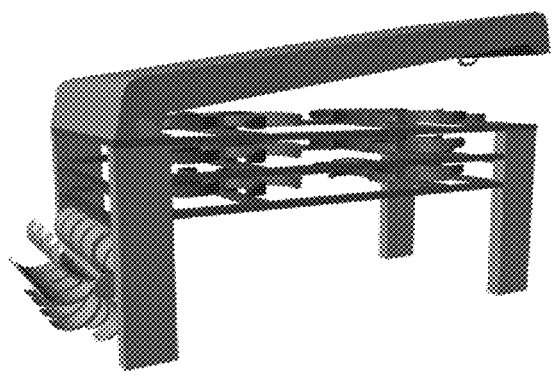
Figure 12C:
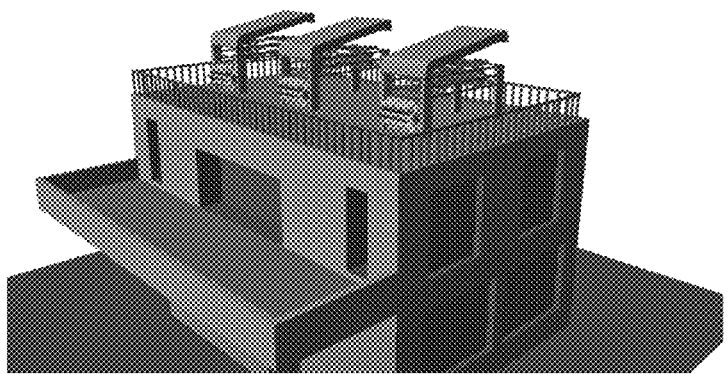

In other embodiments of the present invention, whole or part of the abovementioned embodiments pertaining to solar, rain, wind and thermal energy can be used in a stationary application including but not restricted to homes, buildings, and commercial establishments (including EV charging stations). Examples are shown in accompanying FIGS. 12B and 12C.

Reduction to Practice and Experimental Validation

The present invention has been reduced to practice by the applicant named herein.

As per independent experimentation and simulations carried out in this line, the throughout and efficacy of the present invention can be understood from the following figures—

A) Calculations for Solar Energy Captured and Converted to Electrical Energy by Solar Panels in the Roof Unit (01)

$$\text{Solar Energy:} E = A*r*H*PR$$

where E=Energy in Kilowatt-hour/annum,
A=Area of solar panel ($m^2$),
r=solar panel yield (%) of efficiency,
H=Annual average irradiation on tilted panels (shadings not included)*(Kw-hr/$m^2$ annum),
PR=Performance ratio, the coefficient for losses (ranges between 0.9 and 0.5, default value=0.75)

We take r=20%, PR=0.77, H=2260 Kw-hr/$m^2$ annum, the average solar energy irradiation from literature for predominantly sunny areas on earth; Total surface area, A=3 $m^2$, with extended Solar panels Thus, Solar Energy captured and converted into electrical energy, E=A*r*H*PR=3(0.2)(2260)(0.77)=1044 KWhr/annum Daily Electric Energy extracted, assuming sunshine limited to 80% of the day on an annual basis, is E=(1044/365)*0.8=2.29 KWhr/day or 16 KWhr per week This is significant for a typical 30 KWhr battery capacity of BEV B) Calculations for TEG Under Solar Panels:
  a) The solar panel efficiency being 20%, remaining 80% energy is wasted as thermal energy, this is captured by TEG films having an efficiency=20%, thus energy generated is an additional (0.2)(0.8) i.e. 16% of solar panels.
  b) Energy generated, E=(0.16)×(2.29)=0.37 KWhr/day, i.e. 2.59 Kwhr per week C) Calculations for Flutter-TENG:
  a) Prior art research has demonstrated that When the film thickness, length, and distance between the electrode plates is optimized, considering a wind speed of 10 m/s, the output power 2850 mW/$m^2$
  b) Total surface area of flutter-TENG of both extended solar cassettes=2 $m^2$
  c) TENG generated power, P=2850 mW×2=5700 mW or 5.70 W
  d) Research studies show that cars are usually parked idle for 95% of the day, i.e. 0.95×24=22.8 hrs. Assuming constant wind flow, energy generated during 22.5 hrs, E=5.70 W×22.5=128 Whr, or 0.128 KWhr.

Energy generated per week, E=0.128×7=0.896 i.e. 0.9 KWhr

This is useful for running lights/small accessory loads for a typical 15 to 30 KWhr battery capacity of BEV D) Calculations for Kinetic Energy of Falling Rainwater Captured and Converted to Electrical Energy by Water Turbines/Micro-Water Turbines (06) of the Present Invention:

Efficiency of commercial small sized micro-water turbines that depend on Velocity rather than Jet or Head. is known to be in the range of 50% to 55%, while commercial products advertise as high as 80%.

$$\text{Power:} P = [mg \times H_{net} \times \eta] \text{ KW}$$

where m=mass flow rate in litres/sec,
g=acceleration due to gravity (m/$s^2$)
η=overall turbine+generator efficiency=75%,
$H_{net}$=Head or height of water falling (metre)

A heavy rain is classified as between 10~40 mm rainfall/hour. (1 mm of rainfall equals 1 liter of water over an area of one square meter). Take Rainfall=40 mm/hour=40 liters/$m^2$-hour.

For purpose of this invention, Area of Fixed and Extended solar cassettes act as the catchment area, hence $A_s$=3 $m^2$ when the car is stationary. The inventor wishes to point out that when the car is moving, the solar cassettes are not extended, the Solar Stack Assembly is not tilted, and the effective area for capturing water is the windshield area. $A_g$=1 $m^2$ approx.

Hence maximum catchment area possible, A=3 $m^2$

Thus, maximum volume of water flowing into turbine: V=40 liters/$m^2$ hr×3 $m^2$=120 liters/hour=0.033 litres/sec equivalent to a weight of 0.033 kg/sec Power generated, P=mg×$H_{net}$×η=[(0.033 kg/sec×9.81 m/$s^2$]×[1.5 metre]×[0.75]=0.364 KW Energy generated for a rain duration of 3 hours, E=0.364×3=1.09 KWhr Energy generated over 1 week assuming 3 hrs rainfall daily, E=1×7=7 KWhr.

This is significant for a typical 15 to 30 KWhr battery capacity of BEV

E) Calculations for Harnessing of Energy Exerted by Occupants of a Vehicle

Research studies have shown that the current area power density of TENGs has reached a significant 313 W/$m^2$ and their volume energy density has reached 490 KW/$m^3$. Further advances in basic materials technology is pushing the boundaries for higher power output. Studies have been conducted for vibration energy due to road surfaces transferred to the seat by the human body as well as energy from road transferred to the seat.

For a single occupant ingress into vehicle, occupant mass=75 kg, assuming a vertical velocity of 0.1 m/sec (or alternately a jounce while going over a speed breaker), the Force exerted on seat=75×9.81 m/$s^2$=735.8 Newtons.

Power input=735.8 N×0.1 m/sec=73.6 watts. For 4 passengers to ingress into a vehicle, Power input=73.6×4=294.4 Watts. For 4 occupants of a car to egress out of the vehicle, assume the same energy generated by TENG and =294.4 watts.

Hence total power for one round of ingress and egress=294.4×2=588.8 watts

Mechanical conversion efficiency of advanced materials of multi-layered TENG has reached 85% as per Research studies. The TENG in this invention is innovatively mounted just below the seat cover and for the purpose of this invention, is conservatively assumed to have a lower level of efficiency of only 50%. Thus, power generated by TENG, P=0.5×588.8=294.4 watts For 2 rounds of full ingress-egress by 4 occupants, P=294.4×2=588.8 W or 590 W Electrical Energy generated by TENG over 1 hour, E=590 Whr or 0.59 KWhr, and over 1 week, E=4.13 KWhr This is significant for a typical 15 to 30 KWhr battery capacity of EV F) Bio-Mechanical Energy Recuperation from Brake and Accelerator Foot Pedals Assuming the average force exerted on a brake pedal as 70 lbs/31.8 kg or 318N with a displacement=20 mm, the energy exerted by driver=318Nx(0.02m)=6.36 N-m i.e. 6.36 Joules=6.36 watts-sec.

Assuming city driving @ 4 times braking per minute, i.e. every 15 seconds, i.e. 240 braking operations per hour, energy exerted on brake pedal=6.36×240=1526 watt-hour or 1.53 KWhr or 3.06 KWhr per day for 2 hours of city driving.

While not pressing the brake pedal, the driver is assumed to exert a continuous force on Accelerator pedal (but with less spring force), assume 100N force, and pedal speed=10 mm/sec=0.01 m/sec. It is assumed driver is not operating 100% with Cruise Control in city driving, a realistic assumption. Power, P=100 (0.01)=1 W Energy spent by foot on accelerator pedal: E=that happens 30 times each hour for 2 hours of driving: E=1×30×2=60 Whr or 0.06 KWhr Total energy exerted=0.06+3.06=3.12 KWhr.

The energy harnessed by TENG film at 50% efficiency is, E=efficiency)×(energy available)=0.5×3.12=1.56 KWhr per day, or 10.92 KWhr per week.

This is significant for a typical 15 to 30 KWhr battery capacity of BEV

G) Calculations for Thermal Energy Harvesting from Road Surfaces

It is known from theory that efficiency of the thermoelectric generator is proportional to temperature difference. Efficiencies of current Thermoelectric generator technologies are generally around 7% in prior art and are said to be rapidly improving towards 15%. Calculations show as below that energy conversion can be significant.

The average Solar Radiation impinging per unit area on road surfaces in India such as asphalt and concrete roads is researched in literature as: $E_{radiation}$=5.5 KWhr/m²-day. Area of TEG Film or component fitted on Underbody of a passenger vehicle is taken as 3 m²

Thus Total Thermal Energy availability from road surface corresponding to the area covered by Underbody area of a car=$E_{road}$=(5.5 KWhr/m²/day)*(3 m²)=16.5 KWhr/day Hence Total Electrical Energy converted from road thermal energy to electrical energy considering 10% TEG efficiency:

$E_{final}=E_{road}×10\%$=16.5 KWhr/day×0.1=1.65 KWhr/day, or 11.55 KWhr per week.

This is significant for a typical 15 to 30 KWhr battery capacity of a small EV.

In additional embodiments hereof, it is intended to have additional Thermoelectric Generator Containers provided on the inside surfaces of exterior body panels of vehicle including doors and roof. The exterior body panels of the vehicle can reach temperatures of 70° C. when exposed to solar radiation. This invention harnesses this heat which is wasted in prior art. The calculations would add to the KWhr previously shown.

H) Calculations for Energy Harvested from Tire Side Walls

Prior art research has published that TENG's made with a conductive double-sided carbon tape composed of carbon powder as electrodes, using polyamide 6 as a Tribo-frictional layer, owing to a strong interaction between the carbon electrode, and the Tribo-layer demonstrates a peak output voltage of ~1760 V, short circuit current of ~240 mA/m², and power density of ~120 W/m2

For a Tyre 225/45R17, sidewall height=225 mm×0.45=101.3 mm. Wheel diameter=17"×25.4=431.8 mm. Thus, outer Tyre diameter=431.8+2 (101.3)=634.4 mm. Tyre inner diameter=431.8 mm.

Circumferential Area occupied by TENG modules one inner sidewall: ¾[π/4 4{634.4²−4322}]=169433 mm² or 0.169 m²

Circumferential area considering TENG fitted on both sides of sidewalls: 2(0.169)=0.338 m²

Circumferential area considering TENG fitted on all 4 tyres: 4(0.338)=1.352 m²

Power generated by TENG: P=120 W/m² (1.352)=162 W

Energy generated by TENG for 2 hours of driving: E=162×2 hrs=324 Whr or 0.324 KWhr Energy over 1 week=0.324×7=2.268 KWhr This is significant for a typical 15 to 30 KWhr battery capacity of BEV I) Calculations for Energy Recuperation from Braking Systems Prior art research has studied the total Brake Energy dissipation for normal passenger vehicle when it is stopped using Disc Brakes.

Mass of vehicle-Kerb weight=855-880 kg Gross weight=1315 kg. Assuming a braking condition of deceleration from 80 km/hr to 0 km/hr in 5 seconds, (Initial velocity, u=80 kmph=22.22 m/s Final velocity, v=0 m/s), and assuming uniform brake force distribution on all 4 wheels, considering uniform Brake Force Distribution on all 4 Nos. brakes, the Total load on 1 brake=¼=β, and fraction of kinetic energy absorbed by the brakes, k=0.9

Thus the energy generated during braking will be: $\Delta K.E.=\beta \cdot k \cdot ½ \cdot M(u^2-v^2)$=[¼]*0.9*0.5*1315*(22.222−0) =73040.94 Joules. The Braking Power available, P=K.E./t= (73040.94)/5=14608.19 W.

Thermal Heat Flow divided into 2 opposite faces of each disc=7443 W on both the surfaces. This causes a temperature of around 325° C. on the disc. For the TEG, hot side sees 325° C. and cold side sees ambient, assume 25° C. Then Power produced by TEG module can be roughly estimated by area of TEG exposed to Disc, and this depends on size of TEG Caliper.

Area: For Disc outer diameter=255 mm, Inside dia=155 mm. Total Disc Area on both sides exposed to TEG pads, A=2 [π/4 {255²−155²}]=64370 mm². Take Area covered by TEG pads=¼$^{th}$ of total disc area. This is a reasonably good area under the constraint that er need to allow for disc exposed area too to enable ram air cooling during vehicle motion. Thus, TEG pads area=(64370)/4=16093 mm² or 0.0169 m²

TEG Energy produced for this area, for above ΔT=(325−25)=300° K is: E=100 W approx. This is for 1 disc.

Total TEG energy generated for 4 Nos. Disc Brakes=100× 4=400 Whr per braking action to a stop Driving pattern impact: The actual energy harnessed in real driving scenarios will depend on a number of factors. Assuming vehicle is braked around 3 times per hour of driving, i.e. every 20 sec, and even reducing the braking speed to 50 km/hr to 0 km/hr, we can obtain, E=1000 Whr or 1 KWhr. For 2 hours driving per day, E=2 KWhr. On a weekly basis, E=14 KWhr.

This is significant for a typical 15 to 30 KWhr battery capacity of BEV

J) Calculations for VAWTs

Prior art research shows that wind speeds go more than 10 miles/hr (16 km/hr or 4.4 m/sec in highways in the US. Bridges are closed when speeds exceed 39 miles/hr (62.4 km/hr or 17.3 m/sec). Recent technology has improved the "Starting Speed" of wind turbines to generate electricity to as low as 0.9 m/sec (the previous values being 2.5 m/sec)

Efficiency of wind generators are in the range of 30~45%. Darrieus-type turbines such as ANew-S1 can achieve up to 70% conversion efficiency Using online calculators for Wind Energy for Vertical Axis Wind Turbines, the wind energy converted assuming a efficiency of 40% is given by the equation: $P_{wind} = \eta [0.5 \rho v^3 A] = 0.4 [0.5 (1.225 \text{ kg/m}^3 v^3 A]$ Substituting $\eta=0.4$, air velocity=10 m/sec, blade diameter D=1 m, Height H=50 mm=0.05 m, A=D·H=1m (0.05m), $P_{wind}=12.25$ watts In this invention, for an array of 2 turbines, total Power: $P_{wind}=24.5$ watts Total Energy content over 1 day (24 hours): E=24.5×24=588 Whr or 0.588 KWhr. Over 1 week, that would be 0.59×7=4.13 KWhr.

This is significant for a typical 30 KWhr battery capacity of BEV

Similarly, for active (when vehicle is moving)/passive (when vehicle is stationary but other vehicles in surroundings are moving, creating a draft of air incidental to the stationary vehicle) harvesting of Traffic Wind Energy—

E=5 KWhr per week is estimated including when the vehicle is parked on a busy roadside. This is significant for a typical 15 to 30 KWhr battery capacity of BEV Feed/Offset for Energy Consumption of the Vehicle Research studies showed that the energy consumed by modern car with all LED technology lamps per 100 km running was as follows:

a) headlamp high-beam: (34.4 W)×(9.8 minutes duration)=5.6 Whr b) headlamp short-beam: (54 W)×(97.6 minutes duration)=87.8 Whr c) Brake lights: (5.6 W)×(18.9 minutes duration)=1.76 Whr d) Rear lights: (1.7 W)×(107.4 minutes duration)=3.0 Whr These consumptions can be easily catered for/to by the electricity generated in the multi-disciplinary approach of the present invention.

Overall energy recuperation potential of this invention is described in Table 1 below:

TABLE 1

| Renewable Energy - sources and the mechanisms for harnessing the same | Energy (KWhr) Per day | Energy (KWhr) Per week |
|---|---|---|
| 1) Solar: Photovoltaic arrays: Roof Unit -fixed and extended panels | 2.29 | 16 |
| 2) Thermal: TEG-all 3 solar panels | 0.37 | 2.59 |
| 3) Wind: Flutter-TENG-extended solar panels | 0.13 | 0.9 |
| 4) Wind: wind turbine assembly-Roof Unit | 0.59 | 4.14 |
| 5) Rain: Water turbines-FR and RR | 1 | 7 |
| 6) Solar- thermal Greenhouse Effect: TEG-Interiors-Dashboard, door trims, seats | >1.65 | >11.55 |
| 7) Bio-Mechanical-Interiors-TENG-all Seats | 0.59 | 4.13 |
| 8) Bio-Mechanical-Interiors-TENG-Driver foot pedals operation | 1.56 | 10.92 |
| 9) Solar- thermal Road energy-TEG | 1.65 | 11.55 |
| 10) Thermal-Brake Disc-TEG | 2 | 14 |
| 11) Kinetic energy-Tyre sidewalls-TENG | 0.32 | 2.24 |
| TOTAL ENERGY Recuperation potential with all modes (that is, all renewable energy harnessing mechanisms described above) being available | 12.15 | 85.02 |
| TOTAL MINIMUM ENERGY Recuperation potential with only sunshine, no rain, no winds | 10.42 | 72.98 |

Considering that light compact EV passenger vehicles available commercially today are equipped with Traction battery of around 15 to 30 KWhr capacity, with even lower figures expected for certain lighter small cars, the above estimated figures are encouraging and clearly illustrates that this invention brings significant advantages for not only self-topping up of a traction Battery but also enabling predominantly self-powered EV's.

From the foregoing narration, it shall be appreciated that all major modes of renewable energy conversion are preferably combined simultaneously in one embodiment, wherein Fixed and Extended Solar Panels are sandwiched with thermal energy TEG's and Flutter-type TENG's, Water Turbines, Rotary Wind Turbines, Road thermal energy TEG's, Electric Motor TEG's, Greenhouse Effect induced thermal energy TEG's, bio-mechanical energy TENG's, Wheel and Tyres mechanical deformation energy TENG's, all fitted as described previously, together contribute to a significant amount of harnessed electrical energy. Thus, several parallel energy sources are created to always charge the vehicle batteries while stationary and during motion.

As will be realized further, the present invention is capable of various other embodiments and that its several components and related details are capable of various alterations, all without departing from the basic concept of the present invention. Accordingly, the foregoing description will be regarded as illustrative in nature and not as restrictive in any form whatsoever. Modifications and variations of the system and apparatus described herein will be obvious to those skilled in the art. Such modifications and variations are intended to come within ambit of the present invention, which is limited only by the appended claims.

What is claimed is:

1. A system for allowing an electric vehicle to cohesively harness multiple forms of renewable energy, comprising
   a) a horizontal axis water turbine assembly integrated below the top surface of front cowl of the vehicle, for converting the kinetic energy of water falling on the roof (02) and windscreen of said vehicle into electrical energy;
   b) a roof unit (01) affixed onto the roof (02) of the electric vehicle in a manner being retractable in a predominantly downward direction to be completely flush with the roof line curvature of the vehicle body when required and otherwise able to be articulated in a predominantly upward direction to its normal position above the roof (02) of the vehicle, said roof unit (01) further consisting of:
      a vertical axis wind turbine sub-assembly bolted onto the roof (02) of the electric vehicle for converting the kinetic energy of wind incidental to said electric vehicle into electrical energy;

a stacked solar panel sub-assembly connected in a tiltable manner via a hinge (13) to the vertical axis wind turbine sub-assembly for converting solar and heat energy of sunlight incidental to said vehicle into electrical energy and serving additionally to channel water falling on the vehicle to the front windscreen of said vehicle and therefore to the water turbine assembly to thereby convert its kinetic energy into electrical energy;

a pin and latch arrangement with cable release (14) for locking the vertical axis wind turbine sub-assembly closely with the tiltable sub-assembly along their respective edges opposing ones forming the hinge (13); and a stay rod for holding the tiltable sub-assembly at a height from the vertical axis wind turbine sub-assembly when tilted about the hinge when the electric vehicle is stationary (13);

c) a set of thermo electric generators strategically fitted— in form of a plurality of semiconductor plates acting as a thermoelectric generator onto the underbody and side panels of the electric vehicle for converting thermal energy emanating from hot road surfaces on which said electric vehicle travels and stands, into electrical energy; and in form of a thermocouple films in contact with a metal sheet placed below the dashboard of the vehicle, for converting greenhouse effect thermal energy into electrical energy;

d) a set of Triboelectric nano generators in form of a mat integrated within seats, on accelerator and brake pedals of the vehicle for converting bio-mechanical energy exerted by occupants of said vehicle into electrical energy;

e) a multilayered Tribo electric nano generator module fitted by means chosen among adhesion and co-molding onto the inside of sidewalls of the tyres of the vehicle and inside the enclosed space of the tyres and wheels for recuperation of energy exerted due to mechanical stresses therein into electrical energy;

f) a thermoelectric generator bulk module incorporated in the form of supplementary calipers on brake discs, which are characteristically distinct and separate from brake calipers, for recuperation of frictional heat energy created therein during operation of the electric vehicle, into electrical energy; and g) electrical architecture for linking the components a) to f) in circuit to thus obtain a significant quantum of usable electrical energy generated by cohesively harnessing multiple forms of renewable energy from the immediate surroundings of the electric vehicle.

2. The system for allowing an electric vehicle to cohesively harness multiple forms of renewable energy as claimed in claim 1, wherein the vertical axis wind turbine sub-assembly consists of:

a) a substantially planar structural frame (08) of geometry and contour suitable to that of the roof (02) for anchoring, via nut-bolting, the wind turbine sub-assembly to said roof (02); and b) a latching seat of the pin and latch arrangement (14) fabricated on one edge of the structural frame (08) for locking the stacked solar panel sub-assembly with the vertical axis wind turbine sub-assembly; and c) at least one instance of a vertical axis wind turbine (07) having:

a set (17) of blades which rotate in response to winds incidental to the electric vehicle, said set (17) of blades having their axis of rotation aligned perpendicularly to the plane of the structural frame (08);

a generator (18) at the hub of the set (17) of blades for generating electrical energy in response to being driven by rotation of the set (17) of blades.

3. The system for allowing an electric vehicle to cohesively harness multiple forms of renewable energy as claimed in claim 1, wherein the stacked solar panel sub-assembly consists of a housing (03) within which are stacked:

a) a fixed main solar panel (4e) disposed topmost on the housing (03) to thereby receive sunlight falling on top of the vehicle; and b) a set of supplementary panels (04a and 04b) being stacked beneath the fixed main solar panel (4e) and connected and thereby retractably extendable, under manual pulling action or electronic motors, from the roof unit (01) by means of a sliding brackets coupled with a shaft (05), said shaft (05) being rotatably connected to the housing (03) by means of a freely rotatable bearing, to thereby increase the surface area for collecting sunlight while being able to be oriented, via swiveling about the rotatable shafts (05) for solar tracking and additionally serving to collect rainwater, when incident to the vehicle, to thereby channel it to the horizontal axis water turbine assembly for conversion of its kinetic energy into electrical energy.

4. The system for allowing an electric vehicle to cohesively harness multiple forms of renewable energy as claimed in claim 3, wherein the swiveling of supplementary panels (04a and 04b) is brought about under logic of a software program linked to the sun's position with respect to the GPS location of the vehicle.

5. The system for allowing an electric vehicle to cohesively harness multiple forms of renewable energy as claimed in claim 2, wherein solar panels (04a and 04b and 04e) have a three-layered sandwich construction consisting of:

a) a topmost layer of photovoltaic cells, to convert sunlight into electrical energy;

b) a middle layer of thermo electric generator film affixed to the lower side of the photovoltaic cell layer, to convert the thermal energy of the heated photovoltaic cell layer into electrical energy; and c) a bottom thin layer of Trapezoidal bulk modules of Flutter type Tribo Electric Nano Generator film affixed to the lower side of the middle layer to convert the kinetic energy of wind into electric energy on principle of electrostatic induction.

6. The system for allowing an electric vehicle to cohesively harness multiple forms of renewable energy as claimed in claim 1, wherein the horizontal axis water turbine assembly consists of:

a) at least one micro-water turbine coupled to a AC generator for converting kinetic energy of running rainwater into electrical energy; and b) an AC to DC converter for converting the electrical output of the AC generator to DC current.

7. The system for allowing an electric vehicle to cohesively harness multiple forms of renewable energy as claimed in claim 1, wherein the Triboelectric nano generator mat is integrated into seats of the vehicle by either among— a) embedding it inside a water-proof polymer envelope which is stitched into the seat; and b) co-moulding the mat simultaneously along with the seating foam moulding process.

8. The system for allowing an electric vehicle to cohesively harness multiple forms of renewable energy as claimed in claim 1, wherein the multilayered Tribo electric nano generator module consists of a layer of fluoroethylene polypropylene and PU Polyurethane acting as dielectric elements with each of them mounted on conductive cloth electrodes.

9. The system for allowing an electric vehicle to cohesively harness multiple forms of renewable energy as claimed in claim 1, wherein the thermoelectric generator bulk module consists of:
   a) a thermoelectric generator floating caliper consisting of copper pads juxtaposed on either sides of each brake disc in order to establish surface contact and thereby conduct heat efficiently away from said disc, said thermoelectric generator floating caliper being independent of brake calipers; and
   b) Software-software logic to actuate the thermoelectric generator floating caliper only in the event the electric vehicle is sensed to be parked or stationary.

10. The system for allowing an electric vehicle to cohesively harness multiple forms of renewable energy as claimed in claim 1, wherein the electrical architecture consists of:
   a) wiring to collect DC output from the solar panels and the thermoelectric generators;
   b) wiring to collect AC output from Wind Turbines, Water Turbines, Flutter-Triboelectric nano generators and other Triboelectric nano generator modules;
   c) wiring harness connections for routing of all DC and AC outputs DC-DC and AC-DC inverters followed by a DC-DC converter to result in a final DC output feed to a battery management system; and
   d) logic provisioned with the battery management system for purposing the final DC output to applications selected among charging the traction battery, auxiliary battery, ultracapacitor of the vehicle, powering of vehicle to load devices, and supply to an electrical grid.

11. The system for allowing an electric vehicle to cohesively harness multiple forms of renewable energy as claimed in claim 1, wherein the set of thermo electric generators for converting thermal energy emanating from hot road surfaces on which said electric vehicle travels and stands, into electrical energy are alternatively in form of an electronically actuated retractable swiveling arm with a metal conductor tip which is alternatively:
   a) dropped down to physically contact the road surface when the vehicle is stationary; and
   b) retracted prior to the vehicle being put in motion.

12. An electric vehicle outfitted with the system claimed in claim 1, characterized in having a total energy recuperation potential on an average between 72.98 KWhr to 85.01 KWhr per week, and ranging on an average between 10.42 KWhr to 12.15 KWhr per day, said potential of 12.15 KWhr being a sum total of:
   a) 2.29 KWhr from solar energy, 0.37 KWhr from thermal energy, and 0.13 KWhr from wind energy captured by means of the sandwich solar panels;
   b) 0.59 KWhr from wind energy captured by means of the vertical axis wind turbine sub-assembly;
   c) 1 KWhr from kinetic energy of flowing water captured by means of the horizontal axis water turbine assembly;
   d) at least 1.65 KWhr from greenhouse effect thermal energy;
   e) 0.59 KWhr from biomechanical stresses at seats of the vehicle;
   f) 1.56 KWhr from biomechanical stresses at pedals of the vehicle;
   g) 1.65 KWhr from thermal energy emanating from heated road surfaces;
   h) 2 KWhr from heated brake discs; and
   i) 0.32 KWhr from tyre side walls.

* * * * *